United States Patent [19]

Pfahl et al.

[11] 3,995,958
[45] Dec. 7, 1976

[54] AUTOMATIC DENSITOMETER AND METHOD OF COLOR CONTROL IN MULTI-COLOR PRINTING

[75] Inventors: Kurt A. Pfahl, Leawood, Kans.; Richard A. Robinson, Parkville, Mo.; Craig Ritchie Brougher, Prairie Village, Kans.

[73] Assignee: Hallmark Cards, Incorporated, Kansas City, Mo.

[22] Filed: July 21, 1975

[21] Appl. No.: 597,928

[52] U.S. Cl. .............................. 356/173; 250/559; 356/179; 356/188; 356/195
[51] Int. Cl.² ........................................... G01J 3/46
[58] Field of Search .......... 356/173, 179, 186, 188, 356/189, 195, 206; 250/559, 226

[56] References Cited
UNITED STATES PATENTS 3,890,048  6/1975  Abbondio et al. ................. 356/195

*Primary Examiner*—Vincent P. McGraw
*Attorney, Agent, or Firm*—Schmidt, Johnson, Hovey & Williams

[57] ABSTRACT

A novel and improved method of controlling the quality of color fidelity in the printing of multi-colored subject matter is provided by novel and improved automatic densitometer apparatus adapted to automatically scan the successive differently colored blocks of a color control strip printed along one edge of the printed work piece, to automatically make repeated sensings of color density as the scan proceeds, to automatically change the filters required for sensing the density of different colors as the scan proceeds along the control strip, to automatically activate the apparatus for selecting one sensing of color density as being definitive for each relevant block of the control strip, to automatically print a running record of the definitive color densities sensed from different blocks of the control strip in format juxtaposing the item of the record for each such sensing with the corresponding block of the control strip when the record is placed alongside the control strip, to automatically position such record during scanning in appropriate juxtaposition alongside the control strip so that the densities being recorded can be conveniently checked even during the scanning of a remaining portion of the control strip, and to automatically control the progress of the scanning and the occurrence of the other aforementioned functions in response to changes in the color densities being sensed on a continuously iterated basis as the scanning proceeds. The method and apparatus are applicable to multicolor printing involving various numbers or selections of colors.

26 Claims, 8 Drawing Figures

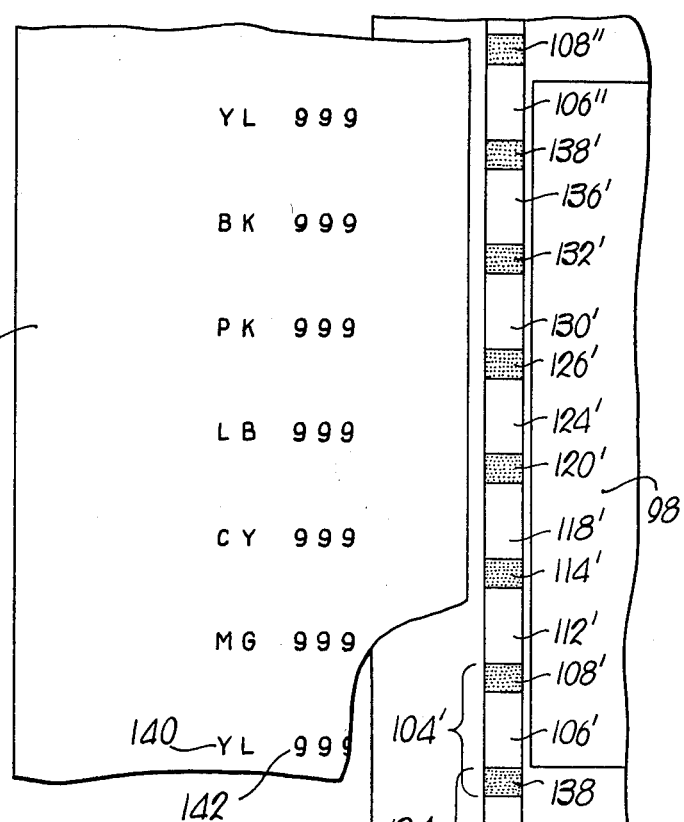
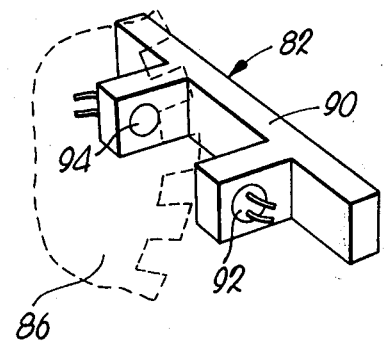
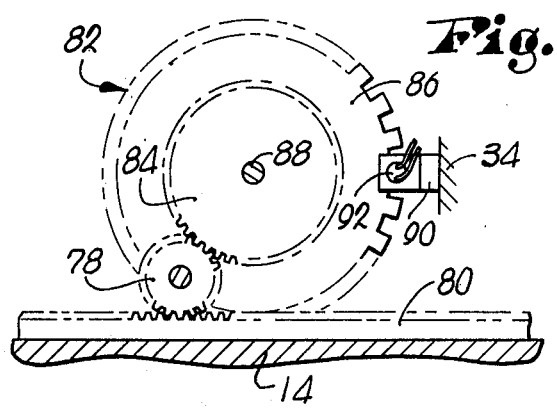

AUTOMATIC DENSITOMETER AND METHOD OF COLOR CONTROL IN MULTI-COLOR PRINTING

This invention relates to a method and apparatus for more efficiently, reliably and economically controlling the quality of color reproduction in multi-color printing.

BACKGROUND OF THE INVENTION

Reproductions of multi-colored subject matter are commonly printed by processes which may vary as to the specific printing techniques or equipment employed, but which have in common the fact that the reproduced work pieces are printed in stages with separate impressions for the components of the subject matter corresponding to each of a selected plurality of colors being imprinted upon the stock successively. The problem of maintaining proper registration between the successive impressions involved in such printing is well known, and much has been done to solve that problem by modern printing technology. However, the companion problem inherent in successive-impression, multi-color printing, that of preserving the fidelity of color reproduction to the quality standards required in producing fine art prints, greeting cards, color-sensitive advertising illustrations and the like, has long resisted the provision of any truly practical and economical solution. It is this latter problem to which the present invention is directed.

Because of the relatively high cost of the stock normally employed in multi-color printing, as well as the time and effort required to prepare a press for properly registered printing of each color impression, it has long been customary to use large dimension stock and to simultaneously print thereon an appropriate lay-out of different graphic subjects, which can then be separated by cutting after the printing is completed. The diversity of the areas of appearance of particular color components in the various subjects to be printed on each piece of stock, the size of the presses needed for handling the large stock, and the manner in which color hues are to be provided in the reproduction from the effects of overprinting impressions of different selected colors, all contribute to the criticality and difficulty of establishing and maintaining uniform color characteristics of desired density throughout the expanse of each successive color impression.

In practical terms, the matter of such color quality control ultimately translates into careful adjustment by the pressman of the multiplicity of ink feed, water feed and other controls affecting the density of the color printed at various zones across the stock by each press or color run until a work piece exhibiting the desired color density and uniformity across the stock is produced, and this is required at every stage of the production process from initial set-up for individual color proofing, through multi-color proofing to obtain an "OKed proof", to final printing in which the approved color characteristics of the OKed proof must be substantially duplicated for every color involved on a continuing basis throughout the production run.

The real gist of the problem, however, concerns what guidance can be provided for the pressman in making such adjustments both accurately and expeditiously in an environment where mere undue delay may cause a change in the characteristics of the printed product sufficient to render it unsatisfactory. Both because multi-color printing usually involves a substantial degree of successive overprinting of the selected colors and for the sake of convenience otherwise, it has for some time been customary practice for the impressions imprinted for each color to include a number of spots or blocks of such color printed adjacent the primary subject matter being reproduced and so arranged as to be offset from such color blocks for the other colors. Current practice arranges such blocks in alignment across the stock to present what is often called a color control strip, which includes sufficient blocks of each color spaced across the stock to provide the pressman with a reliable indication of the color densities for each color at a sufficient number of zones across the stock to determine uniformity or the need for adjustment of the appropriate color-affecting controls on the press applicable to individual zones.

Although earliest practice involved attempted utilization of such color control blocks through visual evaluation, either by mere judgment of the skilled pressman having a "good eye for color" or by visual comparison of such blocks with color samples, such method is simply not sufficiently accurate or reliable for high quality, multi-color work.

With a view to overcoming the inaccuracies of visual color judgements or comparisons, the reflection color densitometer was developed and has enjoyed wide usage. Basically, such instruments have involved an optical assembly for picking up and selectively filtering light reflected from a very small area such as a color control block and for converting the intensity of the light so picked up into an electrical signal whose strength could be indicated on a meter or the like as a measure of color density. Such devices have typically included a hand-held pick-up head requiring careful manual positioning over each color control block to be sensed optically, and the reflected light has then been coupled through a flexible fiber-optics "cable" to a housing containing some provision for changing filters under operator control. The light intensity through the filter has then been sensed, amplified, and converted to a density measurement by appropriate circuitry and a meter or other indicating component.

In recent years, digital type indicating components have replaced ordinary electrical meters, and some densitometer instruments have also been equipped for printing out a permanent written record of density measurements under operator control. In general, however, such popularly employed, manual head, color densitometers, although the best thing long available for the purpose, have suffered from various disadvantages inherent in their constructions and the techniques required for their use, including the time and effort required to manually position the pick-up head over each color control spot, to manually control the selection of a filter appropriate for the particular color of the control block to be sensed, and to attempt to accurately correlate the measurement data produced with the appropriate zones and colors of the work piece as a basis for determining necessary press adjustments.

Most recently, a type of color densitometer has been produced in Europe, which attempted to alleviate some of the mentioned problems by mounting the densitometer head on a movable carriage for mechanically stepped advancement along the color control strip to successively juxtapose with individual blocks of the latter and by providing for the mechanical changing of filters in response to electrical trigger signals. Although such last-mentioned equipment did tend to relieve the operator of the need for manually juxtaposing the pick-up head with each control block and did facilitate the changing of filters in response to a pre-established control, it has not gained wide spread acceptance as any real solution to the overall problem, since the method employed for controlling various functions of the equipment created new problems and inflexibility. More specifically, such last known prior effort to solve the problem contemplated and required, as the initial step for establishing a means for accomplishing what most accurately might be termed "semi-automatic" control over the densitometer system functions, the preparation of a punched tape control medium carrying a sequence of codes which could be successively sensed by a punched tape reader and decoded to provide a sequence of electrical control signals for effecting stepped advancement of the carriage bearing the pick-up head, changing of the filter, and triggering of a device to print or punch measurement data on another paper tape. The initial preparation of such control tapes with the use of a manual or keyboard actuated perforator, however, proved to be a burdensome task. Moreover, each such control tape was essentially limited in use to only the completely imprinted work piece for a particular printing job or ones substantially identical thereto, so that a different control tape had to be prepared for every substantially differing job or stage thereof to be checked. But, perhaps most significantly, the control of the color density checking process and the system functions required therefor in the mentioned method was still left to depend upon the accuracy of the manually generated control tape and to remain inflexibly fixed to the particular control sequence selected and crystallized beforehand by a human operator as what should be appropriate for the particular job.

SUMMARY OF THIS INVENTION

After the frustration of attempting to cope with the color density, quality control problem by means of various of the techniques and equipment suggested by the prior art, however, we have come to recognize what we believe to be the two primary causes why prior efforts to provide a really satisfactory solution to the problem have failed. First, it is now clear to us that both the high cost in terms of time and effort heretofore required for color density checking and the too frequent inaccuracies which have attended such task are directly attributable to the high degree to which human participation in such process has been inherent in prior techniques and equipment. Secondly, we now perceive that such generally and inevitably unsatisfactory approach to the problem has likely persisted in the thinking and attitudes of those working in this art, both naturally and to a large extent perhaps subconsciously, as a result of almost universal acceptance of the premise that the multi-color graphic arts involve such a high degree of aesthetic "feel", skill and judgment that close human control must be retained over virtually every facet of the color checking process.

In the light of these recognitions, we have now further discovered, however, that, although the element of human judgment appear to remain essential at the final and vital stage of the color printing process at which decision must be made as to whether the finished product adequately meets selected color density specifications within suitable tolerances required for it to be "aesthetically right", the human element is neither essential nor so well adapted as technology to controlling the various functions required to obtain the needed color density data and assemble it in conveniently usable form.

Still more specifically, and we think significantly, we have discovered that, when the attributes thereof are properly utilized, the color control blocks imprinted on the work piece itself at virtually any stage of its processing actually provide all that is required to actuate and control the various system functions required in our color densitometer apparatus, and to do so fully automatically!

Accordingly, it is the broad purpose and object of this invention to overcome the disadvantages and limitations inherent in prior, manual and "semi-automatic" methods and apparatus for providing color density data in connection with multi-color printing by means of an improved method and apparatus adapted for automatically making, recording and presenting in more usable form the color density data required for controlling or evaluating the product of a multi-color printing process.

Another object of this invention is to provide such an improved method and apparatus which is not only more reliable and convenient than prior art techniques for the same general purpose, but is also less costly in terms of time, effort and personnel requirements than the latter.

Another object of this invention is to provide such an improved method and apparatus in which true automatic and continuous scanning of the color control strip of a color-printed work piece is provided and in which the vital functions of the color density measuring, recording and data presenting process are all controlled and performed automatically in response to color density sensing from the blocks and possible blanks in the control strip, employing either such sensings alone for some functions to be controlled or such sensings in relation to a measurement of the scanning speed for other functions to be controlled.

Still other significant objects and advantages of this invention will be noted or become apparent from the detailed disclosure of the currently preferred illustrative embodiment thereof hereunder.

THE DRAWINGS

In the accompanying drawings:

FIGS. 4 and 5 are fragmentary, mechanical schematic diagrams, respectively in side elevation and perspective, showing the nature of the currently preferred form of tachometer device used for sensing movement of the scanning carriage;

Figure 7:
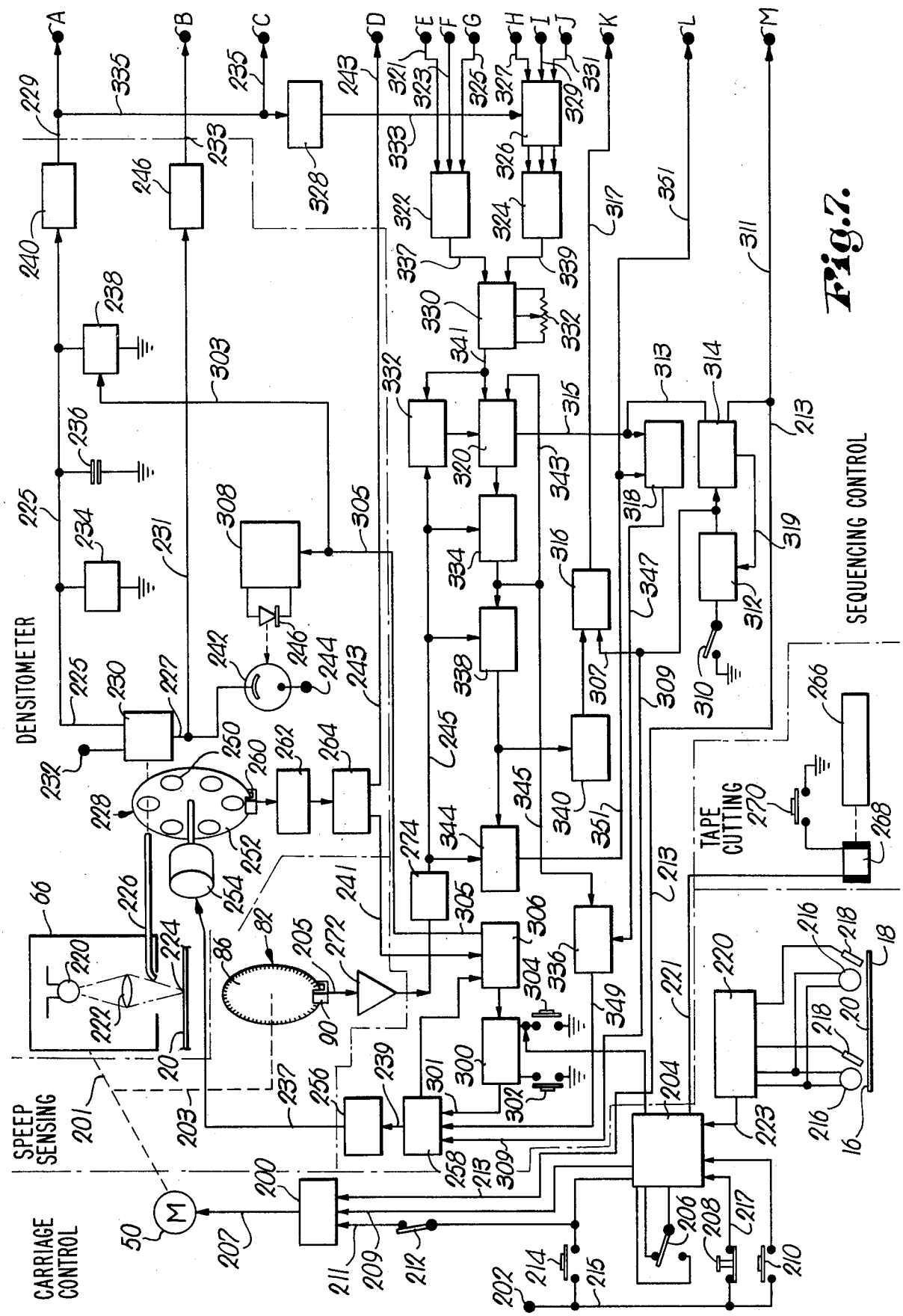
Figure 8:
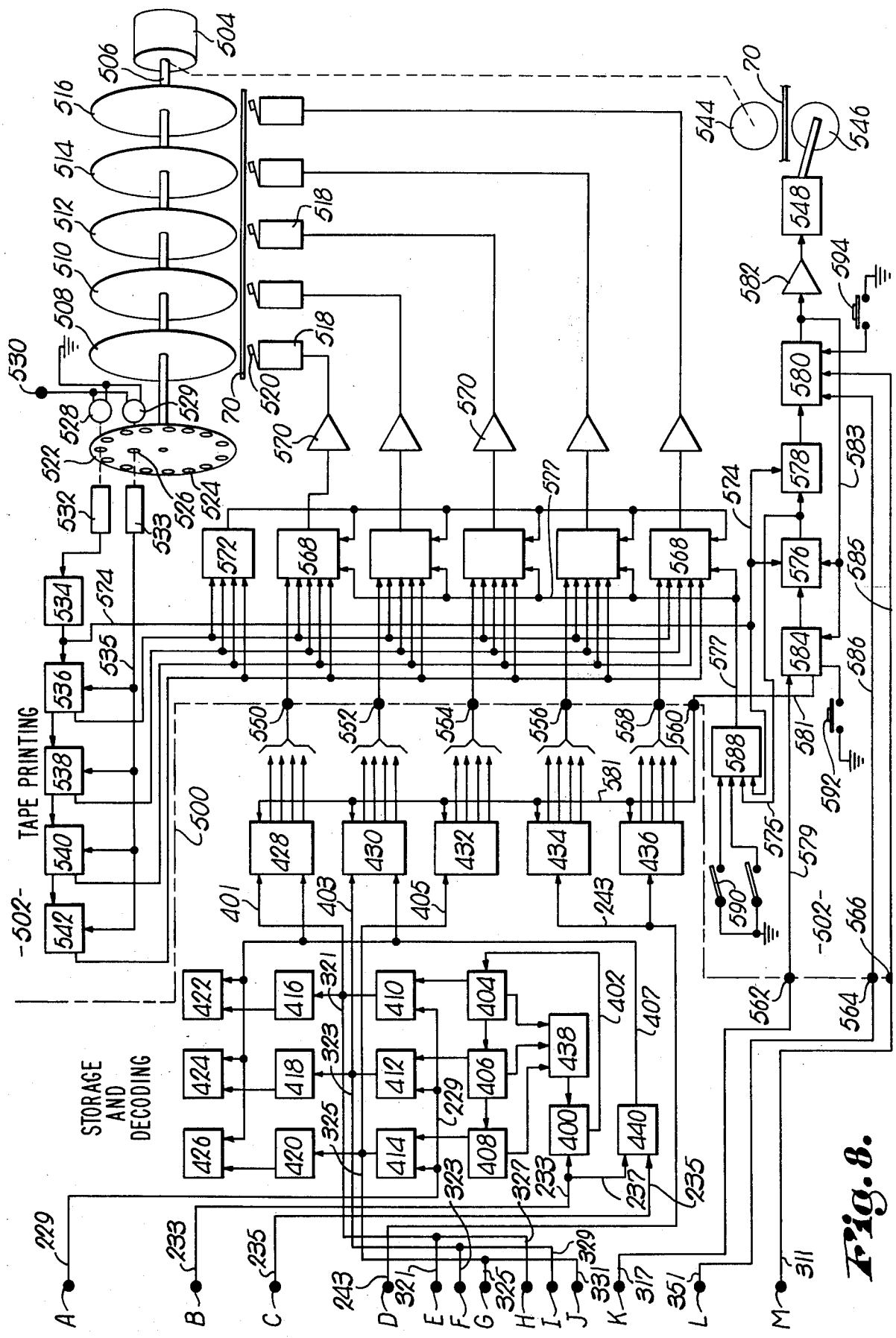

FIG. 6 is a fragmentary top plan view showing a portion of a printed work piece bearing an illustrative form of color control strip thereon and a portion of the printed density data strip produced by the currently preferred form of apparatus of this invention, with the data strip depicted in the correlated juxtaposition with the blocks of the control strip in which it is laid down during scanning; and FIGS. 7 and 8 are a composite schematic and block diagram, mostly in electrical block diagram form but with certain components depicted in mechanical schematic form, showing the various elements and control paths involved in the primarily electrical control portion of the currently preferred embodiment of the apparatus of this invention.

DESCRIPTION OF PREFERRED EMBODIMENT

The relationships between the method and apparatus aspects of this invention are quite close. The general rationale and interdependent natures of both can be most readily perceived from initial brief consideration of their highly intertwined origins.

It will be clear from the character of the problem sought to be solved and our previously noted recognitions and discoveries leading to its solution that the method aspect of the invention is broadly concerned with providing the greatest feasible degree of automatic control over various functional steps of color densitometry, which have heretofore been performed at great cost in time and effort and with substantial vulnerability to human error either through direct manual operations or at least under manually generated control, and with doing so to an extent heretofore accepted as being impractical, if not impossible. More specifically, the method replaces the previous element of human operation or control, which has always constituted the burdensome "bottle-neck" and error prone "weak link" of color densitometry, with automated machine action controlled entirely by the results of previous machine actions, and particularly by the results of sensings of (a) inherently available but heretofore unused "color change" information from the color control strip on the work piece and (b) easily obtained but heretofore unused information concerning the relative motion between a continuously moving sensor and the color control strip since a previous sensing "color change" sensing. Thus, the method essentially involves what might be referred to as a sort of functional feedback loop in which actions occurring in response to and controlled by presently sensed information in turn create the conditions for sensing different information that will precipitate and control further actions, etc.

As a necessary conceptual and practical companion of the method, the apparatus aspects of the invention were needed to provide the tangible means by which the improved method could be implemented and practiced. Besides the more basic mechanisms for executing various steps of the densitometry process (e.g. pick-up head, filters, printers and the like), the apparatus for automating such process required not only means for securing "input" information and for producing "output" control signals, but intervening control structure capable of both interpreting "input" information to produce "output" signals of appropriate number, nature and timing and of controlling its own operation in response to the same "input" information. Thus, any significant realization of the improved method necessarily depended upon the corresponding realization of apparatus adequate for implementing it; and full realization of the method has, therefore, been achieved only through full realization of apparatus adequate for such purpose.

Because of the relationships noted between the method and apparatus aspects of the invention, detailed understanding and appreciation of either without the other would be difficult. This is not to say that the method is essentially dependent upon the precise form of the apparatus that we currently prefer. Indeed, as will become apparent, although we feel our preferred embodiment of the apparatus approaches the optimum for the applications in which there is probably greatest commercial interest, functionally equivalent variations differing from our preferred construction in many details could clearly suffice for use in practicing our basic method of automated densitometry. Nevertheless, is is believed that full understanding of both of the important aspects of our invention may best be imparted by first identifying certain of the more basic elements of the preferred apparatus, then noting the nature of a typical type of color control strip to which the invention is applicable, then outlining the primary sequence of events involved in the preferred method, and then describing in greater detail the nature and operation of the control portions of the apparatus and the correlation of the latter with the more detailed facets of the method which they implement; and such order of explanation will be followed hereinafter.

The Apparatus, Generally

Figure 1:
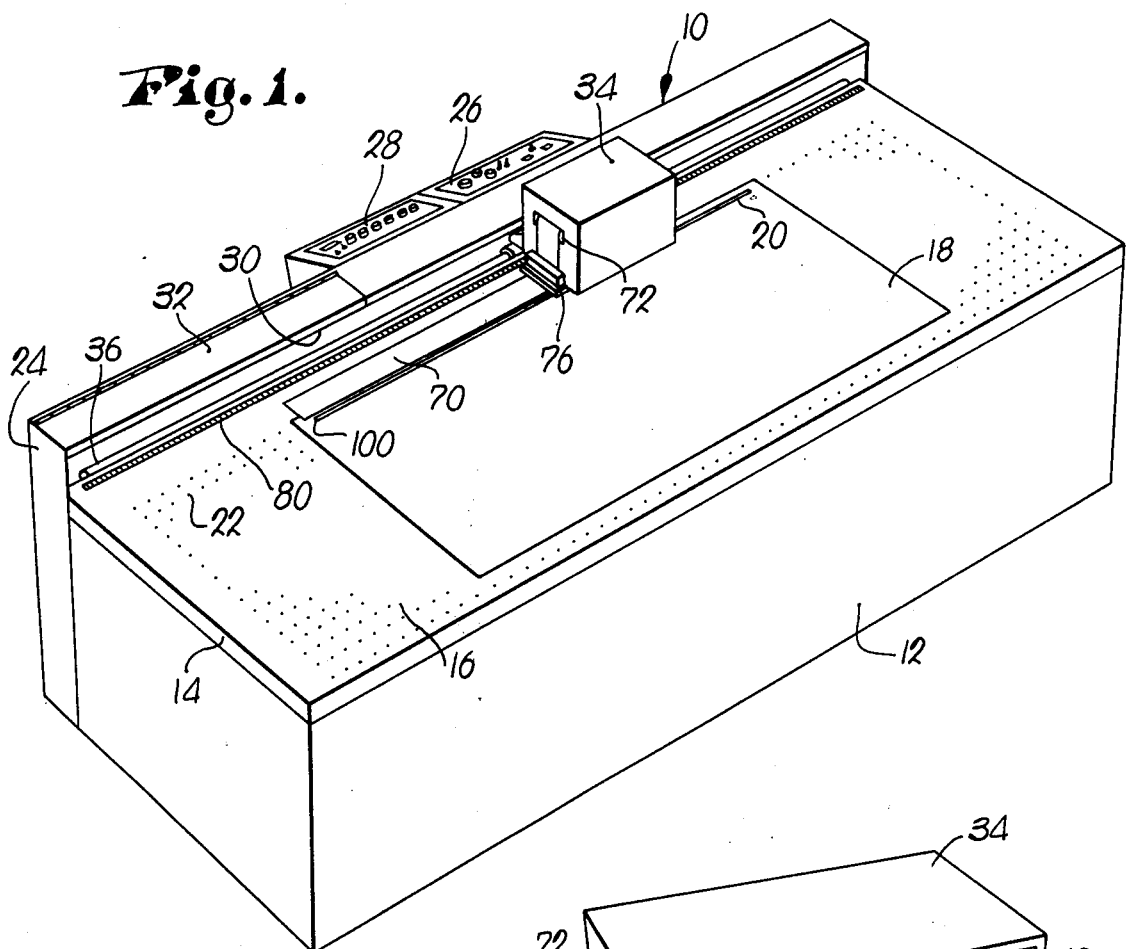
FIG. 1 is a perspective view of the currently preferred embodiment of the apparatus of this invention showing the general configuration thereof.

Referring initially to FIG. 1 of the drawings, the preferred form of apparatus chosen to illustrate that aspect of the invention herein is generally designated 10.

The apparatus 10 includes a lower base and housing structure 12 upon which is supported a table-like, elongate top 14 providing a flat upper surface 16 for receiving and supporting a printed work piece 18 bearing a color control strip 20. The top 14 is provided with a plurality of suction holes 22 therethrough (the size of which appears exaggerated in the drawing), which may be present in any portion of the area of the top 14 appropriate for handling work pieces 18 of the sizes to be accommodated, and which are conventionally coupled in the manner of vacuum tables with any suitable vacuum source (not shown) within the housing structure 12, for use in holding a work piece 18 firmly in place at a selected position on the support surface 16. The surface 16 also preferably is provided with guide markings (not shown) thereon to assist in positioning a work piece 18 on the surface 16 with its control strip 20 aligned with and extending along a predetermined linear zone of the surface 16.

Along one side thereof, the housing structure 12 is provided with a section 24 extending above the level of the surface 16. A monitoring and operator panel 26 is mounted on the section 24 and has various knobs, switch handles and indicators thereon, such as generally indicated at 28, some of which are for use by an operator in performing mundane functions such as turning on the main electrical power for apparatus 10 or activating the vacuum source for top 14, while others are hereinafter more particularly described in connection with the control portion of the apparatus. The elevated housing section 24 is provided with an elongate opening 30 facing and extending along the top 14, for purposes shortly to be noted, and is preferably also equipped with a hinged cover 32 to provide convenient access for maintenance to the space therebelow containing the carriage guiding and driving structure hereinafter described.

Figure 2:
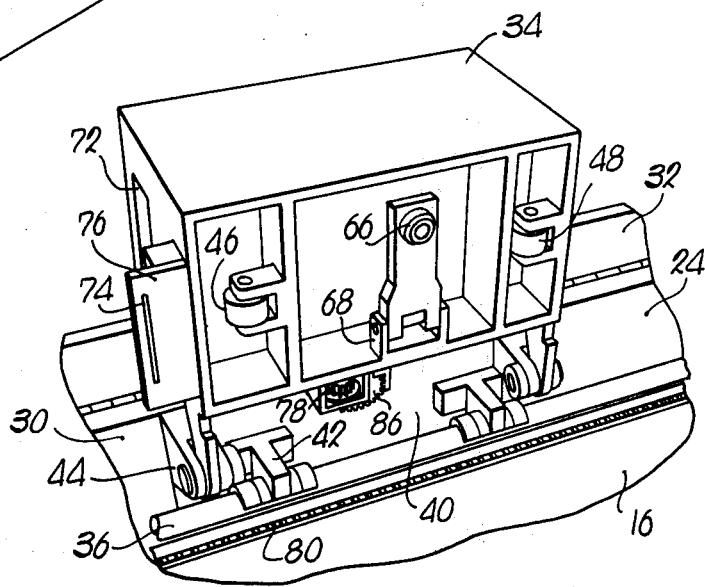
FIG. 2 is a fragmentary perspective view of the scanning carriage portion of the apparatus, with such carriage tilted up away from its operative scanning position to show the densitometer pick-up head, and with various electrical components and connections which might normally be visible from the underside of the carriage omitted for clarity of illustration of the primary elements.
Figure 3:
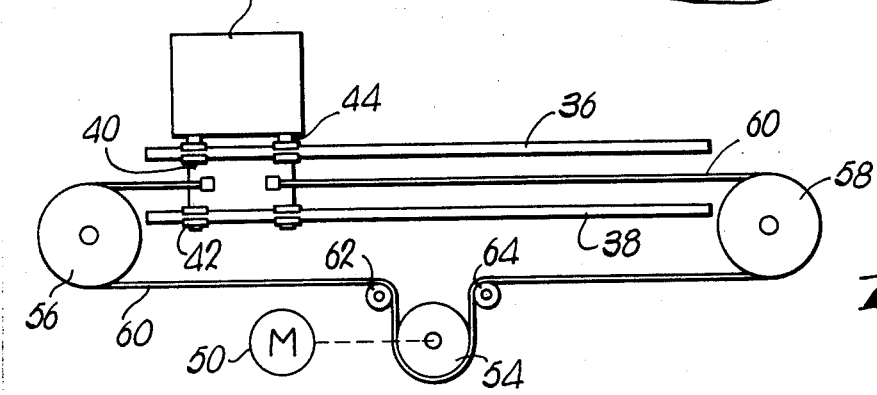
FIG. 3 is a mechanical schematic diagram showing the nature of the currently preferred form of drive and couplings used for moving the scanning carriage.

Referring now also to FIGS. 2 and 3, a movable, generally box-like carriage 34 will be seen to normally extend over a portion of the surface 16 and the control strip 20 of a work piece 18 operatively positioned on the surface 16 for color density checking. The carriage 34 is mounted on the structure 12 for reciprocal movement along a linear path precisely parallel with the mentioned linear path precisely parallel with the mentioned linear zone of the surface 16 with which the control strip 20 is aligned. This is effected in the preferred embodiment by means of upper and lower guide rods 36 and 38 supported on the structure 12 within section 24 thereof, which are also parallel with the mentioned linear zone of the surface 16; a guided plate 40 slidably carried by the rods 36 and 38 through sleeve brackets 42; and hinge brackets 44 extending through the opening 30 and pivotally mounting the carriage on the guided plate 40 for swinging movement between a normal operative position overlying the surface 16 as shown in FIG. 1 and a raised position to provide access to components on the bottom of the carriage 34 as shown in FIG. 2. A pair of rollers 46 and 48 are provided on the bottom of the carriage 34 for supporting it during operational movement thereof sufficiently above the surface 16 to clear the work piece 18.

The means within the housing structure 12 for driving the carriage 34 along its linear path in either direction is schematically depicted in FIG. 3 and includes an ordinary reversible electric motor 50, which significantly need not be and is not of the stepping or incremental motion variety; a drive sheave 54 coupled with the motor 50 for rotation by the latter; a pair of opposite end sheaves 56 and 58 rotatably carried by the structure 12; and a cable 60 trained around the drive sheave 54 and a pair of idler sheaves 62 and 64 for maintaining the cable 60 sufficiently tight upon the drive sheave 54 to avoid slippage and thence oppositely around sheaves 56 and 58 with the ends thereof oppositely secured to the guided plate 40 in any suitable fashion.

It is a significant feature of the apparatus 10 that essentially all of the main operational components of the color sensing densitometer and the automatic control portions of the apparatus 10 are carried by or housed within the carriage 34, so that inter-component electrical couplings are localized and simplified. It will be understood, however, that electrical power connections to the movable carriage 34 and certain electrical connections between the latter and the panel 26 are conveniently effected through flexible electrical cabling (not shown except in the electrical schematic Figures of the drawings). Similarly, to maintain reasonable clarity of the primary physical elements depicted in FIGS. 1 and 2, no effort has been made to shown therein all of the control and functional components carried by the carriage 34; three of such items, whose physical positioning is significant, however, are shown in FIGS. 1 or/and 2 and should be noted at this time.

First, it will be observed that a sensing pick-up head 66 for the color densitometer assembly hereinafter further described is swingably mounted on a bracket 68 carried on the bottom of the carriage 34 in such position as to directly overlie and remain in centered alignment with the color control strip 20 of a work piece 18 being checked as the carriage 34 is moved along its linear path of travel to scan the color blocks of the strip 20.

Secondly, it will be understood that the carriage 34 houses a tape printing mechanism, also later more fully described, from which a paper tape 70 having color density measurement data printed thereon emanates as at 72 and is thence guided through a slot 74 in a tape guide bracket 76 on the normally rear end (during scanning) of the carriage 34 in such manner as to lay the printed tape 70 directly alongside the control strip 20 of the work piece 18 to juxtapose the items of printed measurement data on the tape 70 in line with the corresponding color blocks of the control strip 20 to which it relates (also see FIG. 6).

Thirdly, for purposes later clarified, the carriage 34 rotatably carries on its bottom a pinion 78, which is disposed to ride upon an elongate toothed rack 80 mounted on the surface 16 and extending along the edge of the latter adjacent the housing section 24. As the carriage 34 is moved along its path of reciprocation by the drive means shown in FIG. 3 and previously described, the pinion 78 will be rotated by its engagement with the stationary rack 80, and the amount of such rotation of the pinion 80 will significantly be exactly proportional to the linear travel of carriage 34, despite any aberrations in rate of travel of the carriage 34 due to the possible effect of line voltage fluctuations on the drive motor 50 or other extraneous factors. As further schematically shown in FIGS. 4 and 5, the pinion 78 constitutes a part of an electrically implemented tachometer or travel sensing assembly 82, which further includes a gear 84 meshed with the pinion 78 for rotation by the latter; a peripherally slotted wheel 86 coupled with the gear 84 for rotation therewith upon a shaft 88; and a bracket 90 on the carriage 34 carrying, on opposite sides of the slotted portion of the wheel 86, a photo-electric cell 92 facing an electrically energized light emitting diode or other light source 94. As the wheel 86 is rotated in correlation with the travel of the carriage 34, the light path between the source 94 and the cell 92 is alternately cleared and interrupted to provide an electrical output from the cell 92 in the nature of a series of pulses, the number of which occurring during any interval proportionately represents the amount of linear travel of the carriage 34 during such interval.

The Color Control Strip

FIG. 6 shows a typical color control strip 20 of the type now conventionally imprinted on work pieces 18, as it would appear on the latter after the successive imprinting of all of the impressions for an illustrative multi-color set of six colors and assuming that all six colors of such set were used in printing the subject matter of the particular work piece 18. Such maximum number of colors of the multi-color set to be handled by a particular apparatus 10 could, of course, be greater or less than six, with only minor modifications of nature apparent to those skilled in the art being made to the preferred embodiment being described for illustrative purposes (e.g., appropriately altering the number of later described, complimentary filters required). Provision for handling the color density checking of multi-color printing involving up to six separate color impressions appears to be the commerical optimum, however, since more than six color impressions are rarely used even in the most exacting multi-color printing and, as will become increasingly clear, the method and apparatus of this invention accommodate, without modification or operational disadvantage, the automatic checking of work pieces 18 that have been imprinted with only some selected plurality of color impressions of any lesser number than the maximum set of colors (six in the preferred embodiment), which the apparatus 10 is equipped to handle. Thus, it should be understood that the control strip 20 on a work piece 18 to be checked by the apparatus 10, where one or more of the full set of six colors were not used in the printing (or the impressions therefor had not yet been imprinted on a work piece 18 to be checked at an intermediate stage of its production), would differ from the complete six-color control strip 20 shown in FIG. 6 only in that the color blocks for the unused (or not yet imprinted) colors would be blank and merely expose the natural (usually white) color of the stock where such color blocks otherwise would have been. Accordingly, the apparatus 10 is adapted to successively handle the color densitometry process for work pieces 18 printed in any number of the colors of the full color set for which it is equipped (i.e., from two, or if appropriate even one, to six colors in the preferred embodiment being described for illustrative purposes).

Before examining the color control strip 20 in greater detail, it should be observed that it is built up during successive imprinting of the work piece 18 with the successive impressions of the various colors to be used in printing the colored graphic subject matter involved, with normally several control blocks being imprinted for each color at spaced intervals along the length of the control strip 20 being thus built up. The color blocks for each color impression are so offset along the length of the strip 20 from the blocks for the other colors that the blocks of the various colors will appear in a particular cyclic order along the strip 20, and the blocks for "adjacent colors" are so dimensioned and positioned that they will overlap during the successive overprinting of the impressions for the various colors to present what we call a "trap" zone at their area of overlap, which will be of a color resulting from combining the two overlapped colors. The strip 20 is preferably printed substantially parallel to what is known in the graphic arts field as the "tail" edge 96 of the stock upon which the work piece 18 is being produced, so that the several color blocks imprinted for each color will be "spread across the width" of the press by which they are imprinted to facilitate later press adjustments dictated by the density readings for particular color blocks of the control strip 20. It should also be noted that the control strip 20, in view of the precision of the automatic scanning achieved by the apparatus 10, may be both narrower and printed much closer to the tail edge 96 than is common in manual densitometry and indicated in FIG. 6; but those skilled in the art will appreciate the substantial savings in stock costs from being able to use a narrow strip 20 disposed closely adjacent the edge 96. Similarly, it will be noted that the areas of primary subject matter being printed on the work piece 18, only one of which is indicated at 98 in FIG. 6, may also be disposed closely to the strip 20 and to each other in stock-saving lay-outs of the primary subject matter.

The end 100 of the strip 20 at which scanning is commenced is spaced from the adjacent corresponding edge 99 of the stock of work piece 18 sufficiently to leave a blank or unprinted area 102 of the stock ahead of the strip 20, which area 102 may be used for calibrating or "zeroing" the densitometer portion of the apparatus 10 for the particular stock upon which the work piece 18 is printed, as later described, which is desirable since the imprinted colors are superimposed on the stock and the "shade" of white or other color of the stock will have an inherent effect upon the measured density of the colors printed thereon.

The set of six colors chosen for implementing our preferred embodiment, in order in which they cyclically appear in the control strip 20 commencing from the lead end 100 thereof, are yellow, magenta, cyan, light blue, pink and black, which are preferably of industry accepted shades for which both printing ink and the complimentary filters hereinafter noted as employed in the densitometer portion of the apparatus 10 are conveniently available. Any other set of six (or more or less) colors could, of course, be chosen for implementing the apparatus and performing the method contemplated by the invention, as might best meet the customary requirements of a particular printing application or organization, or if it were desired to provide for a six-color printing process employing a specifically different set of colors for which inks and filters were available, this obviously could be done without departing from or foregoing the advantages of the present invention.

In the preferred form of color control strip 20, what may be called the color "patches" printed for each color include a leading block portion nearest the end 100 of strip 20 printed in the appropriate color and normally overlapped with the preceding color patch to present a trap block portion of different composite color, followed by a pure or unmixed color block portion within which a significant density measurement is to be made, followed by a trailing block portion disposed to overlap with the leading block portion of the next following color to present the next trap block portion in which those colors are combined. In the typical control strip 20 illustrated in FIG. 6, the following color patches and block portions thereof may be identified commencing from the lead end 100: a yellow patch 104 including an unmixed yellow block 106 (which is somewhat longer than the other pure color blocks, since there is no other preceding color patch overlapping therewith) and a trap block 108 of yellow and magenta combined; a magenta patch 110 including the yellow-magenta trap block 108, an unmixed magenta block 112 and a trap block 114 of magenta and cyan combined; a cyan patch 116 includng the magenta-cyan trap block 114, an unmixed cyan block 118 and a trap block 120 of cyan and light blue combined; a light blue patch 122 including the cyan-blue trap block 120, an unmixed light blue block 124 and a trap block 126 of light blue and pink combined; a pink patch 128 including the blue-pink trap block 126, an unmixed pink block 130 and a trap block 132 of pink and black combined; a black patch 134 including the pink-black trap block 132, an unmixed black block 136 and a trap block 138 of black and yellow combined; the next yellow patch 104' of the repeating cycle, including the black-yellow trap block 138, an unmixed yellow block 106' and a trap block 108' of yellow and magenta combined; and so on, in the same order noted for the first six-color cycle, to present second and subsequent color cycles of the color control strip 20.

It will be perceived that the interfacing between adjacent ones of the patches 104, 110, 116, 122, 128, 134, 104', etc. represented by the lead edges of the trap blocks 108, 114, 120, 126, 132, 138, 108', etc. present seams or boundaries across which substantially different color density measurements would be expected to and do occur, if the same complimentary filter is used by the densitometer apparatus 10 for such measurements of both sides of such boundary, which effect is significantly utilized in connection with the automatic control portion of the apparatus 10, as hereinafter further explained. At this juncture, however, it would seem sufficient further to note only that, when the work piece 18 has not been imprinted with an impression for any particular color or colors of the six-color set (either through selection of a lesser plurality of colors to be used in printing the particular work piece 18 or the checking of a work piece 18 at some intermediate stage of its processing at which all of the colors ultimately to be used have not yet been imprinted thereon), the interfaces of the patches for the colors which have been imprinted, with any unprinted areas of the work piece 18 at which color patches would normally have been expected to appear in the cyclic arrangement of the strip 20, will be a seam or boundary between the block of the printed color and an adjacent blank patch or block in which the normally white color of the stock upon which the work piece 18 is being printed will be presented to the pick-up head 66 of the densitometer as the scanning of the control strip 20 proceeds across such seam or boundary. As will later be made more apparent, it is significant that such a transition of the densitometer pick-up head 66 across a boundary between a patch of printed blank area of unprinted stock will also result in a substantial change in the color density measurements being made by the densitometer, which effect is also utilized in the automatic control functions provided by the apparatus 10, as hereinafter also further explained.

Before leaving FIG. 6, it should be observed that the output information printed on the tape 70 includes, for each of the color blocks whose densities are to be sensed and recorded, a corresponding line of indicia including any suitable abbreviation 140 for the particular color involved and an appropriate numerical representation 142 (indicated in the drawings merely by "999", since the values will vary with the work piece 18 being checked) of the color density measured by the apparatus 10 for the corresponding color block. It will also be observed that no color identification or density measurement data are printed on the paper output tape 70 for any of the trap blocks formed in the control strip 20 by overlapping color patches. The significance of these aspects of the printed output record tape 70 will be more clear when it is also observed that the lines of the printed indicia 140 and 142 are so spaced and located along the length of the tape 70 that they will each be in juxtaposed alignment with the particular color block of the control strip 20 to which they correspond and will enjoy such juxtaposition even as the tape 70 is being laid down upon the support surface 16 during scanning movement of the carriage 34 along the control strip 20.

PRIMARY SEQUENCE OF EVENTS IN METHOD

The details of the preferred method and apparatus of the invention hereinafter discussed, and particularly the significance of various relationships between such matters, should be more readily understandable in the context of the overall invention, if considered in the light of some further background as to what broadly occurs and in what general sequence during a typical employment of the invention.

Accordingly, assuming that a fully or partially printed work piece 18 having a color control strip 20 has been properly positioned on the surface 16 and secured in place by a vacuum appropriately applied to holes 22, that the operator has "zeroed" the color density measuring circuitry for the color of the stock on which the work piece 18 is printed by means of controls 28 on the panel 26 as later described, and that the carriage 34 is at its start position near the end of the structure 12 adjacent the lead end of the control strip 100, the entire process of color density checking and recording contemplated by the invention may be initiated by operating a manual start switch on the panel 26 and then normally proceeds to completion automatically and without operator intervention.

During one complete application of the method to a given work piece 18, as performed with the preferred apparatus 10, after manual initiation, the carriage 34 is moved by the motor 50 toward the work piece 18 then into an overlying relationship thereto in which the densitometer pick-up head 66 is traversing the blank or unprinted area 102 of the stock of the work piece 18 and, during an early portion of such movement, the selective filtering assembly forming a part of the densitometer unit later to be described is automatically indexed to select the proper filter to be used for density measurements in respect of the first color of the selected set (e.g. yellow, in the control strip of FIG. 6); when the carriage 34 has advanced the pick-up head across the blank area 102 to within, say, ⅛ inch of the lead end 100 of the strip 20, the scanning is automatically interrupted and verification data respecting the accuracy of the operator's zero calibration for the blank stock, as measured with each of the filters provided in the densitometer assembly, is automatically obtained by the automatic triggering of a "zero print routine" in response to the carriage 34 reaching a predetermined position, which involves cycling through the various filters once, measuring the color density of the blank stock with each filter, and printing the results of each such measurement of a lead portion of the paper tape 70 not shown in FIG. 6; the scanning is then automatically resumed (at, say about 2½ inches per second) and, as movement of the pick-up head 66 relative to the work piece 18 continues toward the lead end 100 of the control strip 20, repetitive color density measurements during scanning (at, say, about 60 per second or about every 1/20 inch of scanning movement) are commenced, but no further measurement data is printed for any of such measurements until after a substantial predetermined change of level in the color densities being successively measured is detected, from which sensing a particular subsequent measurement is automatically selected as significant and to be recorded for the corresponding color block; and then such scanning and repeated measurements are automatically continued along the entire control strip 20, with the other important steps of the overall process being automatically controlled from and conformed in sequencing and timing to the requirements of and "input" from the color control strip 20 of the particular work piece 18 being checked and, more specifically, in response to sensings of substantial changes in the level of successive density measurements, which occur as the scanning proceeds across the "seam" or interface between adjacent color patches (e.g., from color block to trap block) in the control strip 20. In the preferred embodiment of the method, various steps are also initiatable in response to sensings of the absence of a substantial change of density level during a predetermined period of continued scanning, so that the generalized method will be equally applicable to the checking of both work pieces 18 which have been imprinted in every color of the selected set (with every block in the control strip 20 thus being a color block) and work pieces 18 which have been imprinted in less than all of the selected set of colors (with some blocks in the control strip 20 thus being blank or unprinted stock). Among the primary steps of the process being controlled by sensings from the control strip 20 itself are the automatic selection of the appropriate type of filtering for each expected color block of the strip 20, the automatic selection of a particular density measurement as a definitive one to be recorded for each color block, and the automatic printing of the definitive density measurements in a predetermined arrangement on the paper tape 70 and in juxtaposed relationship with the corresponding blocks of the strip 20 to facilitate human use of the data resulting from the color checking process in making the press adjustments or the like required for maintaining the desired color control standards.

Further details of our method will be pointed out or become apparent from the following description of the nature and operation of the preferred form of apparatus, which we have created for practicing such method.

THE PREFERRED EMBODIMENT OF THE APPARATUS

Aside from certain general mechanical aspects of the apparatus 20 illustrated in FIGS. 1-5 and a few other mechanial and optical details thereof explained in connection with particular elements shown in FIGS. 7 and 8, the apparatus 20 is essentially electrical in character and employs digital and logic components and relationships to a substantial extent. As might be expected, therefore, we have desirably found it possible to construct the electrical control circuitry of our apparatus not only through the use of commercially available components and modules, but also through the employment of same in generally well known types of electronic functional sub-units that are familiar to those skilled in the art (with respect to which individual and conventional sub-units per se we make no claim). For the noted reasons, and since those skilled in the art should have no difficulty in selecting for purchase appropriate functional components, modules or even certain sub-combinations thereof adapted for serving as the sub-units herein identified and for suitably performing the herein specified functions thereof (or, if desired, in constructing the same in any of the often numerous, functionally equivalent ways now commonly known in the electrical arts), it is believed most proper and likely to facilitate understanding of the apparatus 20 by those skilled in the art for such apparatus to be shown and described herein only at the "block diagram level" and without needless reference to familiar and frequently variable internal details having no real bearing on our invention or the novel "functional block" combination and relationships involved therein. With minor exceptions, this approach has been adopted in connection with FIGS. 7 and 8, in which it will be further noted that the electrical paths shown between functional blocks are essentially limited to signal and main energization paths, with component operating D.C. voltage connections, common D.C. grounds, "low side" A.C. lines and the like generally omitted for clarity of illustration. It is also believed that understanding of the apparatus 20, as well as full appreciation of the intimate relationship it bears to the method aspects of our invention, will be best achieved by presenting various structural details of the primarily electrical, remaining portions of the apparatus 10 shown in FIGS. 7 and 8 in the general perspective of their operational significance; and this approach will likewise be followed hereinafter to the greatest extent felt practicable.

Accordingly, and with particular reference initially to FIG. 7, we may first identify at the upper left the previously mentioned reversible electric drive motor 50, the densitometer pick-up head 66 that is carried on the movable carriage 34 (which is operably coupled with the motor 50 as previously described in connection with FIG. 3 and as indicated by the dotted line 201 in FIG. 7), and the slotted wheel element 86 of the travel sensing assembly 82 that is carried on the carriage 34 (and which is operably coupled, indirectly, with the motor 50 via the carriage 34, pinion 78 and rack 80 as described in connection with FIG. 4 and as indicated by the dotted line 203 in FIG. 7). In general, the motor 50 is adapted, when operated in a forward rotational direction, for moving the carriage 34 along a linear scanning path from a standby or "home" position adjacent the end of the surface 16 nearest the viewer in FIG. 1 to a fully reciprocated or "finish" position adjacent the opposite end of the surface 16, while the travel sensing assembly 82 provides at signal line 205 an electrical pulse train electrical signal representative of the rate of scanning movement of the carriage 34 relative to the surface 16 and work piece 18 during possible variations in the speed of motor 50 due to supply line voltage fluctuations or the like; when the motor 50 is operated in its reverse direction of rotation, the carriage 34 is returned to its home position.

The operation of the motor 50 is controlled by a motor control module 200, which may be understood to include conventional windings, relays, energizing circuits, etc., the details of which may vary with the particular type and model of the reversing motor 50 being employed. In the preferred embodiment a A.C. reversing motor is employed and the necessary electrical and/or magnetic couplings between the control module 200 and the rotative part of the motor 50 are collectively indicated by the single arrow 107. The most significant thing to be noted about the control module 200, however, is that it is provided with power input leads 209 and 211 which, when energized, operate the motor 50 in a forward or reverse direction respectively, and is also provided with an inhibit signal input lead 213 for receiving a stop signal effective to interrupt forward motion of the motor 50 during the continuance of such stop signal even though the forward power input lead 209 may remain energized. The source and reason for such normally absent stop signals will be later described.

Operating energization to be supplied to the motor 50 via the leads 209 and 211 of the control module 200 is derived from an A.C. power source indicated by the terminal 202. Interposed between the power terminal 202 and the motor control module 200 are a plurality of control switches that are hereinafter specifically identified in connection with their representations in FIG. 7, together with what may perhaps best be called a scan control unit 204, which includes additional switches for controlling the energization of motor 50 in response to particular switch conditions or control inputs also hereinafter further described. A single pole, double throw, manual switch 206, whose elements are connected with the energizing path networks within the scan control unit 204, permits operator selection between automatic forward scanning, as normally employed, or, if desired, manual control of forward scanning with a push button switch constituting one of the other controls 28 on the operator panel 26. Assuming the selection of the automatic mode of scanning by appropriate setting of the switch 206, energization power for forward operation of the motor 50 is supplied from the terminal 202 through a lead 215, a normally closed, manual stop switch 208 and a lead 217 entering the energization networks of the scan control unit 204; it is noted, however, that internal switching provided within the scan control unit 204 conventionally prevents energization of the motor 50 until a manual, normally open scan initiate switch 210 has been at least momentarily closed by the operator to establish the necessary holding circuits within the networks of the scan control unit 204, thereby initiating an automatic forward scan cycle. The scan control unit 204 also includes as a part of its internal switching networks at least one limit switch defining the above mentioned finish position for the forward scanning motion of the carriage 34, so that, when the carriage 34 reaches such limit position, energization of the motor 50 will be changed from forward motion energization through line 209 to reverse motion energization through line 211. Such last mentioned limit switch is not physically represented in the drawings, but will be mounted upon the housing structure 12 along the path of the carriage 34 to be engaged and actuated by the latter when it reaches its finish position; it is desirable that such finish position limit switch either be shiftably mounted on the structure 12 to permit convenient adjustment by the operator of the location for the finish position in order to accommodate various sizes of work pieces 18 without unneeded extension of the length of the scanning path or, as in the preferred embodiment, it has been found convenient to provide several alternate finish position limit switches fixedly mounted on the structure 12 but spaced at predetermined intervals along the scanning path, together with a manual selection switch forming one of the controls 28 on the panel 26 by which the operator may conveniently switch any one of such limit switches into the energization networks of the scan control unit 204 to appropriately set the finish position for the carriage 34 in accordance with the size of a particular work piece 18 to be checked. It will be understood, therefore, that once forward scanning is initiated by operator closure of the scan initiate switch 210, and after the temporary stop for zero calibration printing previously mentioned and hereinafter also further described, forward scanning motion of the carriage 34 will proceed (at, say, 2½ inches per second) until the carriage 34 has completed its scan of the entire control strip 20 and reached its finish position, whereupon the finish position limit switch and the energization switch networks provided by the scan control unit 204 will automatically remove forward motion energizing power from the control module 200 and the motor 50 and commence supplying reverse motion energization thereto through a standby or home position limit switch 212 and the reverse energization line 211. When the carriage 34 has fully returned to its home position, the limit switch 212 will interrupt the reverse motion energization of the motor 50, and the carriage 34 will be located in stopped, standby condition at its home position in readiness for energization of the next scan upon the next work piece 18 to be checked. It should be noted that, should it become necessary for any reason to interrupt the motion of the carriage 34 even during automatic scanning, the operator may do this by at least momentarily opening the stop switch 208; then, by closing a manual return switch 214 connected between the power terminal 202 and the home position limit switch 212, he may reenergize the motor 50 for reverse movement to return the carriage 34 to its home position as previously described.

Before leaving the portion of the apparatus 10 that is concerned with controlling the motor 50 and the movement of the carriage 34, it should be observed that the networks of the scan control unit 204 provide upon lines 219 and 221 two control outputs which occur at times and are utilized for purposes hereinafter described. Also, although if a work piece 18 is properly emplaced upon the surface 16 in the first place there is little probability of the densitometer pick-up head 66 straying out of full alignment with the control strip 20, it may be desirable in particular environments to provide a control input to the networks of the scan control unit 204 via a line 223, for the purpose of disabling any further energization of the motor 50 and motion of the carriage 34 until the operator can take appropriate corrective action and restart the scanning process when a misalignment does occur; one approach to providing such a control signal to the line 223 is to provide a pair of light source devices 216 (preferably implemented by fiber-optic carriers associated with bulbs or other light generating means) and a pair of photo-electrical pick-up cells 218 carried on the bottom of the carriage 34 for scanning the control strip 20. The distance between devices 216 and cells 218 along the length of the strip is equal to the longitudinal displacement between successive cyles of the control strip 20 so that the cells 218 are both looking at a block of the same color of different control strip cycles. Additionally the cells are offset from each other in a direction transverse of the control strip 20 so that one cell 218 senses the color of the block thereunder adjacent one edge of the control strip 20, while the other cell 218 is positioned to sense the similarly colored block of an adjacent cycle proximal to the opposite edge of the control strip 20. The cells 218 are coupled with an amplifier and logic module 220 for supplying an "off-track stop" signal to the control unit 204 via line 223 in the event that the position of the work piece 18 shifts to an extent such that the cells 218 no longer sense the same color from blocks of adjacent cycles of the control strip 20 (i.e. their outputs are no longer the same for a finite, predetermined period), whereupon the module 220 is actuated to generate a control signal upon line 223 for interrupting the scanning.

Attention may next be given to the densitometer portion of the apparatus 10. In such connection, it should be noted that at least the primary optical and many of the electronic parts or functional modules for the densitometer may be obtained commercially, for example, from the Model 126 Digital Densitometer marketed by Graphic Arts Mfg. Co. of Houston, Texas;

it will be appreciated, however, that such parts (including the pick-up head, which is manually positionable in the mentioned commercial unit) will require rearrangement and remounting on or within the carriage 34. Additionally, we prefer to substitute a modified form of indexable filter assembly, zeroing circuit and calibration circuit to assure the fast and automatic changing of filters needed with our relatively fast, continuous scanning (as compared with the manual switching of filter changes, which is conventional in commercial densitometers employing manual, intermittent repositioning of the pick-up head). Also, what may be called the utilization circuitry for the electrical outputs resulting from the electro-optical color density measurements is specific to our apparatus 10.

The densitometer pick-up head 66 includes an electric lamp 220, a lens 222 for focusing the beam of the lamp 220 upon a small spot 224 of the control strip being scanned, and a number (sometimes called a "bundle") of fiber-optic elements 226 arranged (preferably in annular fashion around the focused beam from lamp 220) to pick-up light reflected from the spot 224 and direct such light through the filtering assembly 228 toward the photo-sensitive cathode of a photomultiplier tube 230 conventionally provided with a dynode power supply and bias divider (represented in FIG. 7 by a power terminal 232) and having a dynode lead 225 and an anode lead 227. Coupled with the dynode lead 225 are an oppositely grounded, unfiltered half-wave rectified, 60 Hertz, A.C. power source 234, an oppositely grounded capacitor 236, an oppositely grounded calibrator resistance circuit 238, and the input terminal of a dynode reference voltage detector 240 having an output lead 229 for what we call read pulses. Coupled with the anode lead 227 are a photodiode 242, which is oppositely coupled with an anode power supply (represented in FIG. 7 by a power terminal 244) and a line 231 leading to the input terminal of an anode reference current detector 246 having an output lead 233 for what we call clock start pulses. The photodiode 242 provides the anode load for the photomultiplier tube 230, and such load is adjustable by varying the energization of a light emitting diode 246 optically coupled with the photodiode 242 in manner hereinafter noted to control the degree of conduction of the photo-multiplier tube 230 for a given color density and to establish what will be regarded as zero density.

The densitometer portion of the apparatus 10 which may be of known construction preferably operates to measure color density in terms of the intensity of light received at the photo cathode of the photo-multiplier tube 230 from the fiber optics elements 226, after appropriate filtering by the assembly 228. Central to such function is the capacitor 236 and its rate of discharging through the photo-multiplier tube 230 following each charging thereof by the output from the unfiltered half-wave source 234. Since the current flow through the photo-multiplier tube 230 is proportional to the intensity of the light applied to its photo cathode, both the rate of discharging of the capacitor 236 and the time required for it to discharge a given amount is proportional to the intensity of the reflected light picked-up from the spot 224 and, after filtering thereof, applied to the photo cathode of tube 230. More specifically, each half-wave power envelope from the source 234 applied through the lead 225 to the capacitor 236 and the dynode of the tube 230 raises the voltage across and charge upon the capacitor 236 to a level in excess of that required to measure the maximum color density of interest. During the remainder of the cycle, when no power is being supplied by the source 234, the capacitor 236 discharges so that the voltage presented at the dynode of the tube 230 and upon the lead 225 decreases exponentially in precisely that amount required to equate color density with time. A corresponding decrease in the anode current of the tube 230 concurrently occurs. The anode reference current detector 246 monitors the anode current and, when the latter falls below a reference level established in the detector 246, it generates a clock start pulse upon its output lead 238. Similarly, the dynode reference voltage detector 240 monitors the dynode voltage and, when the latter falls below a reference level established in the detector 240, it generates a read pulse upon its output lead 229. It will be understood that the read pulse output by the dynode detector 240 for each 60 Hertz cycle of source 234 lags the clock start pulse output by the anode detector 246 for that cycle by a variable time period proportional to the color density of the spot 224 being scanned.

Before completing consideration of the densitometer portion of the apparatus 10 with reference to the filtering assembly 228, the functional relationship of the clock start pulses and the read pulses to certain utilization circuitry therefore makes it desirable to next discuss the latter. At this point, it must also be observed that space limitations in the drawings required much of the utilization part of the densitometer circuitry, which could not be accommodated in FIG. 7, to be carried over to FIG. 8. Accordingly, it should be understood that the terminal-like symbols correspondingly designated A through M along the right edge of FIG. 7 and the left edge of FIG. 8 are intended to represent merely inter-sheet cross-over points.

Referring to the further portion of the densitometer circuitry shown in FIG. 8, therefore, it will be seen that, when the anode detector 246 (in FIG. 7) outputs a clock start pulse to its output lead 233, such pulse is applied to the input of a clock pulse generator 400 (in FIG. 8) to start the clock 400 operating to deliver at its output lead 402 a train of clock pulses of predetermined repetition rate. Such clock pulses are input from lead 402 to the first of three interconnected decade counters 404, 406 and 408, where they are counted in terms of a three digit decimal number, which initially may be thought of as representing the passage of time following the closk start pulse from the anode detector 246. When the read pulse is generated by the dynode detector 240, at an interval of time following the clock start pulse corresponding to the color density being sensed for that cycle of the half-wave source 234, such read pulse is applied via lead 229 to a gating control input terminal of each of three storage registers 410, 412 and 414, whereupon whatever count values were then present in the decade counters 404, 406 and 408 are transferred into and stored in the storage registers 410, 412 and 414. In view of the time-color density equivalence of such count values, they constitute a three decimal digit representation of the color density measurement in binary coded decimal form. The storage registers 410, 412 and 414 are respectively coupled with three decoder circuits 416, 418 and 420, which in turn are coupled with and control three corresponding nixie digital read-out tubes 422, 424 and 426 to provide a visual indication for the operator upon the panel 26 of the last color density measurement in our preferred embodiment of the apparatus 10. Perhaps more significantly, however, it will be noted that binary coded digital density measurement data is also fed from the storage registers 410, 412 and 414 to a further set of corresponding storage registers 428, 430 and 432 via multi-conductor paths 401, 403 and 405. The storage registers 428, 430 and 432 are preferably interposed at this point to provide isolated, binary coded decimal outputs representing color density measurement values in a manner permitting convenient coupling and inputting thereof into corresponding four-conductor terminals 550, 552 and 554 of the printing mechanism later to be described.

It will be observed that the clock pulse generator 400 is not stopped by the occurrence of a read pulse, even though the instantaneous values in the counters 404, 406 and 408 are transferred into the storage registers 410, 412 and 414 only at the time of occurrence of the last read pulse. Thereafter, however, the clock 400 continues to increment the values in the counters 404, 406 and 408 until they have passed through their maximum count and returned to the value of zero. A zero detector module 438 monitors the values in the counters 404, 406, and 408 and, when they are all returned to zero, generates a clock stop pulse which terminates the operation of the clock 400 until the next clock start pulse is received from the anode detector 246. Until the next clock start pulse and its following read pulse have occurred, however, the density measurement values in the storage registers 410, 412 and 414 will remain at the values existing at the time of the last read pulse, so that the density values displayed by the nixie tubes 422, 424 and 426 and the values available to the printer sub-unit 500 from the registers 428, 430 and 432 will be "up-dated" at approximately the 60 Hertz rate resulting from the frequency of the half-wave source 234.

It was found that, if the anode current of the photomultiplier tube 230 should, on some particular cycle, fail to exceed the reference current required by the anode detector 246, due to misadjustments or the like, it would be possible for the dynode detector 240 to generate a read pulse without any preceding clock start pulse having been generated for that cycle by the anode detector 246. In such event, the read pulse would cause the storage registers 410, 412 and 414 and the display and printing information normally supplied thereby to be falsely "up-dated" to the standby all-zero values remaining in the counters 404, 406 and 408 in the absence of a clock start pulse. To prevent such type of false ostensible density measurement and the erroneous output indications which would arise therefrom, we include in the preferred embodiment of the apparatus 10 a latch circuit 440 arranged to receive as inputs both read pulses via line 235 and clock start pulses via line 233 and lead 237. The latch 440 functions to provide a control signal upon its output line 407 that is fed to both the display tubes 422 and 424 and 426 and the printer interface storage registers 428, 430 and 432, which will cause the tubes 422, 424 and 426 to display some special indication of the falsity of the last recorded density measurement data, such as a display consisting of decimal points in every digit position; and such control signal upon the output lead 407 from the latch 440 will also remove the supply voltage from the printer interface registers 428, 430 and 432 so as to cause the printer 502 to also record some special indication of the situation, such as all asterisks.

Attention is next directed back to FIG. 7 and particularly to the indexable filtering assembly generally designated 228, which constitutes a part of the densitomer portion of the apparatus 10. The assembly 228 involves a plurality (one for each color of the set to be checked by the apparatus 10) of colored filters 250 arranged in an annular row in holes in a rotatable disc 252. The filters 250 are normally of colors considered to be complimentary by industry standards for the particular colors of ink to be used in printing the work pieces 18 and whose densities are to be checked; it should be understood, however, that the filters 250 to be used may be of the same color for checking two or more of the ink colors that are selected, in which event we still prefer to provide a physically separate filter 250 for each color to be checked. Thus, with the six color set chosen for illustration in the preferred apparatus 10, it will be noted that the filters 250 are spaced at 60 degree angular intervals around the disc 252 and arranged to each, in turn, intersect the light path between fiber optics elements 226 and the cathode of the photomultiplier tube 23o as the disc 252 is indexed.

To provide fast and positive, stepped indexing of the filter disc 252 in angular increments of 60 degrees corresponding to the displacement between adjacent filters 250, we employ a phase-input-sensitive, servo type, stepper motor 254, upon whose shaft the disc 252 may be directly mounted. Three-phase positioning signals are provided to the motor 254 via line 237 from a servo motor control module 256 adapted for changing the phase of the positioning signals to step the disc 252 by a 60 degree angular increment in response to each control pulse fed to the module 256 from an OR gate circuit 258 whose multiple (or alternative) triggering inputs will be later noted.

Both because of the necessity for indexing the disc 252 to present the filter 250 for the proper color of the control strip 20 to be first encountered upon the commencement of a scanning operation (yellow in the color set chosen for illustration), and the necessity to somewhat obtain the information required for printing along with each selected density measurement an identification of the color to which such measurement relates, as well as the need for a reliable source of information concerning which of the filters 250 is in the operative filtering position for use in connection with other control functions hereinafter mentioned, it has been found desirable to provide some such means having a direct tiein with the densitometer portion of the apparatus 10 itself. Accordingly, indicia means (not shown) in the form of groups of four areas, each of which is either clear or opaque, are emplaced at 60 degree intervals around the circumference of the disc 252, with each of such groups having its clear and opaque areas arranged in a different combination representing a three bit binary code for identifying each of the filters 250 and a single bit strobe to assure correct positioning of the disc 252 prior to reading. An assembly 260 is stationarily positioned adjacent the circumference of the rotatable disc 252 for sensing the particular codes thus applied to the circumference of the disc 252 for whichever of the filters 250 may then be positioned in an operative filtering relationship to the beam of light to be filtered; our preferred construction for the assembly 260 involves four light emitting diodes and four photo-transistors arranged in pairs on opposite sides of each of the mentioned clear/opaque areas for sensing the light passed through each of the areas which is clear. The signals derived from the photo-transistors of the assembly 260 in the preferred embodiment are fed through an amplifying and storing module 262, which in turn is coupled with an identifier and encoder module 264 having a control output lead 241 and an encoded, color identification signal lead 243 for carrying the coded signals representing the abbreviation for the relevant color to the printer interface storage registers 434 and 436, whose contents are available to the printer sub-unit 502 via the terminal means 556 and 558.

In order to complete the identification and description necessary for understanding the invention of the remainder of the sub-units and components of the apparatus 20 involving a substantial degree of mechanical subject matter, and before explaining the nature and operation of the remaining portion of the apparatus 10 involving primarily electronic modules arranged to provide the control functions required by the apparatus 10, we next turn attention to the tape printing mechanism portion of the apparatus 10. In such respect, reference is made to FIG. 8 and particularly to the portion of the structure depicted in such figure that lies to the right of the dotted line 500. That portion of the apparatus 10 is the mentioned tape printing mechanism, which is conveniently housed within the carriage 34. Moreover, such printing mechanism is, with a limited number of minor modifications therein felt desirable and made for purposes of the preferred embodiment of the apparatus 10, a Model 5055A Digital Recorder of the type marketed by Hewlett-Packard Corporation of Palo Alto, California.

The printing mechanism, which will hereinafter be designated by the reference numeral 502, includes a continuously running internal motor 504 upon the shaft of which are mounted a plurality of character wheels of which the apparatus 10 utilizes five that are designated 508, 510, 512, 514 and 516. Each of the character wheels 508 et seq. is provided about its circumference with type embossments for sixteen characters, the wheels 508, 510 and 512 being employed in the apparatus 10 in respect of the ten decimal digit type embossments thereof, while the wheels 514 and 516 are utilized to provide suitable abbreviations for the six colors of the set chosen for purposes of illustration to be checked for density by the apparatus 10. Below the wheels 508, et. seq. are a plurality of corresponding printer solenoids 518, one for each of the wheels, and each provided with a printing hammer 520 adapted to impact a side of the paper tape 70 that is imprinted by the mechanism 502 oppositely from the type embossments on the wheels 508, et seq. It will be understood that the solenoids 518 are actuatable independently of each other and that actuation of any given solenoid 518 will result in the imprinting upon the paper tape 70 of whatever character has its type embossment on the corresponding wheel 508 et seq. positioned oppositely the corresponding hammer 520 at the instant of actuation of such solenoid 518.

A clock wheel 522 is also mounted upon the shaft 506 and continuously rotated by the motor 504. The clock wheel 522 has an outer annular row of timing holes 524 and a single inner reset hole 526. A light beam from a lamp 528 energized from an A.C. power source 530 is interrupted at an essentially regular repetition rate dependent upon the speed of rotation of the motor 504 and is sensed by a photoelectric pick-up component 532, which in turn triggers a monostable or one-shot multivibrator 534. The clock pulse output from the multivibrator 534 is employed to actuate a four-bit binary counter having stages 536, 538, 540 and 542, the outputs from which counter are used in a manner hereinafter discussed.

Also operably coupled with the internal printer motor 504 for rotation thereby is one of a pair of feed rollers 544 and 546 for the paper tape 70 (it being noted that the tape 70 is shown twice in FIG. 8, once adjacent the printing solenoids 518 in transverse cross section and again between the feed rollers 544 and 546 in fragmentary longitudinal cross section). The feed roller 544 is continuously rotated, but the tape 70 is advanced and issues from the carriage 34 as at 72 (See: FIGS. 1 and 2) only when the roller 546 is swung toward the roller 544 and into clamping relationship with the tape 70 by a solenoid 548.

The printing mechanism 502, including the mentioned commercial version thereof, is provided with a number of terminal means including data input terminals 550, 552, 554, 556 and 558; an inhibit control signal output terminal 560; a print pulse input terminal 562; and a normal paper advance pulse input terminal 564. In the modification we have made in the preferred embodiment of the apparatus 10 upon the commercial mechanism 502, we have added a further terminal 566 for a zero print-spacing control signal. The terminals 550, 552 and 554 each provide four conductor connection points for the input to the printer mechanism 502 of a four-bit binary coded decimal representation of the three decimal digits of a color density reading to be printed and which is generated in manner later described. Similarly, the terminals 554 and 556 provide for the input to the printer mechanism 502 of four-bit binary codes for identifying the alphabetic letters to be imprinted upon the paper tape 70 as abbreviations for the several colors of the set whose densities are to be checked by the apparatus 10. Such coded numeric and alphabetic information received via the mentioned terminals 550, 552, 554, 556 and 558 is respectively fed to five corresponding, identical, comparator-decoder modules 568, the output of each of which is coupled through a driver-amplifier 570 with the corresponding printing solenoid 518. It will be noted that enabling signals for the comparators 568, which are time synchronized with the rotational positions of the character wheels 508, et seq., are derived from each of the counter stages 536, 538, 540 and 542, which those skilled in the art will understand permits any printing solenoid 518 to be actuated only when the type embossment on the corresponding character wheel 508 et seq. that is juxtaposed in printing relationship to the paper tape 70 is that character for which the corresponding comparator 568 has decoded a "match" with the data being input thereto. More specifically, printing of a particular character by any of the wheels 508, et seq. occurs only when the binary count signals fed to any of the comparators 568, et seq. from the counters 534, et seq. are exactly equal to the binary inputs also being fed to the corresponding comparator 568, et seq. as representing a digit of a density measurement or a letter forming part of a color abbreviation. As hereinafter explained, no character is printed, however, until a primary inhibit control signal normally applied to the comparator 568 is removed. The sensings from the counter stages 536, 538, 540 and 542 are also fed to a NAND gate 572, whose output may be applied to the comparators 568 for secondarily inhibiting the printing of leading zeros that may appear in the input data. At the completion of each revolution of the motor 504, a reset signal is generated by light from a lamp 529 passing through the reset hole 526 in wheel 522 onto a second photo-electric component 533, and such a signal is applied via lead 535 to each of the counters 536, 538, 540 and 542 to reset them to zero.

A clock signal output from the multivibrator 534 is fed via lead 574 as a control input to a NAND gate circuit 588, a clock gate control flipflop module 576 and a divide by sixteen module 578. The output of the gate control flipflop 576 is applied to the divider stage 578 and also fed via 575 as a further input to the NAND gate 588. Control inputs from a number of switches 590 monitoring such conditions as the printer 502 being out of paper tape are also applied to the NAND gate 588. The output of the NAND gate 588 provides a primary print inhibit control signal for the comparators 568, which is fed to the latter via a lead 577. When a print pulse control signal from portions of the control circuitry of the apparatus 10 yet to be described is received at the printer input terminal 562, it is applied via line 579 as an input to a print command storage flipflop 584, setting that flipflop. Thereupon the flipflop 584 provides a data hold control signal via line 581 and the printer output terminal 560 to each of the printer interface storage registers 428 et seq. to cause the latter to hold the data last stored therein until a printing operation can be completed.

When the print command storage flipflop 584 has been set by a print pulse control input, such flipflop 584 also feeds a control signal to the clock gate control flipflop 576, whereupon the next clock pulse received by the clock gate control flipflop 576 via line 574 sets the flipflop 576 to apply a reset to the divide stage 576 to reset the latter, as well as providing an output pulse via line 575 to the NAND gate 588, which in turn alters its control signal to the comparators 568 via line 577 from one inhibiting to one enabling the comparators 568 to be operative. The comparators 568, once so enabled, remain so during the next sixteen pulses from the clock 534, during which period the count data from the counters 536, et seq. are compared for equality with the density and color abbreviation data also being fed to the comparators 568 as previously described. When any of the comparators 568 detects a "match" between the input data and the counter data, the corresponding solenoid 518 is energized to print the appropriate character. After such sixteen clock pulse period, however, the divide circuit 578 feeds a control pulse to a one-shot multivibrator 580, the output pulse from which is then fed back along a line 583 to reset the print command flipflop 584 and the clock gate control flipflop 576. The output pulse from the multivibrator 580 is also applied through a driver-amplifier 582 to the solenoid 548 that swings the feed roller 546 into position for advancing the paper tape 70. When the flipflop 584 is reset, the data hold signal that had been applied via line 581 to the printer interface data storage registers 428, et seq. is removed so that the latter may again accept up-dated data. Similarly, resetting of the flipflop 576 removes the enabling control signal to the NAND gate 588, whereupon it again applies to the comparators 568 a control signal inhibiting their operation.

It should be noted that the length of the output control signal from the multivibrator 580, and therefore the period during which the feed roller 546 remains in its operative position for advancing the paper tape 70, ultimately depends upon the value of internal resistance forming a part of the R.C. time constant circuitry of the multivibrator 580. In our preferred apparatus 10, we replace such internal resistance within the multivibrator 580 of a commercially purchased printer unit 502 with a value suitable for producing a pulse of length resulting in advancement of the paper tape 70 by that distance necessary to assure proper juxtaposition of the data printed on the tape 70 with the corresponding color blocks of the control strip 20, and should further observe that the replacement resistance employed for such purpose may preferably be variable to permit occasional fine adjustment by the operator of the distance intervals which occur during each advancement of the tape 70. Since we prefer to print the zero calibration data occurring at the commencement of each scan with a lesser spacing than required for the color block density data, we effect a second modification of the purchased printer unit 502 involving the addition of an input terminal 566 for receiving a zero print spacing signal from portions of the control circuitry of the apparatus 10 yet to be described and for applying such control signal via a line 585 to the multivibrator 580 for effectively altering the mentioned time constant determining resistance to a still different appropriate value. The input terminal 564 forming a regular part of the commercial unit 502 is adapted to receive a control input for application to the multivibrator 580 via 586, which causes the multivibrator 580 to output a tape advance pulse even when no corresponding print operation is occurring, which we employ to maintain proper spacing and juxtaposition between data printed on the tape 70 and the color blocks of the control strip 20 in respect of the dual-color trap blocks for which no density data is printed. In the preferred embodiment a cutter blade 266 is provided for severing the paper tape 70, which is operated by a solenoid 268 in response to either a manual switch 270 or a control signal via line 221 from the scan control module 204 when completion of a scan is sensed by actuation of the "finish" limit switch. Finally, before leaving the printer 502, it should be observed that manual switches 592 and 594 are provided and respectively coupled with the print command flipflop 584 and the multivibrator 580 to permit manual energization of a print or a tape advance operation in the event that it should be desired, such as during loading of the printer 502 with tape or maintenance operations.

The mechanical aspects of the travel sensing assembly 82 have been previously noted in connection with FIGS. 4 and 5. From the electrical standpoint, however, it should be noted that the photo-electric cell 92 carried by the bracelet 90 (see FIG. 7) is coupled by line 205 and an amplifier 272 to supply a triggering control input to a oneshot multivibrator 274 each time the carriage 34 has been moved through a distance aligning another slot of wheel 86 (see FIG. 4) with the path between light source 94 and cell 92. Thus, the pulses output onto line 245 from the multivibrator 274 provide a reliable sensing of the actual distance traveled by the carriage 34 during any time span, regardless of variations that may occur in the speed of operation of the motor 50 due to supply voltage fluctuations or the like. Moreover, when such sensings of distance traveled are referred to any particular frame of time reference, as is effectively done in portions of the control circuitry yet to be described, a reliable indication of the rate of travel of the carriage 34 is provided by the repetition rate of the pulses output from the multivibrator 274, The remaining functional modules and their interrelationships with each other and the other portions of the apparatus 10 heretofore identified can be most meaningfully explained in conjunction with consideration of a typical operational sequence, in which their importance in accomplishing the automatic controls required for achieving essentially operator-independent, scanning color densitometry will be more apparent. By such approach, the overall manner of operation of the apparatus 10 should also be clarified.

Accordingly, assume that a work piece 18 imprinted in the six color set previously mentioned and having a control strip 20 as described in connection with FIG. 6 is properly positioned and secured on the surface 16 so that the strip 20 is aligned and centered with the scanning path of the pick-up head 66. If the apparatus 10 has not been sufficiently recently calibrated for the type and color of stock upon which the work piece 18 is printed, the operator may set the mode switch 206 to manual and, by means of the manual forward and reverse switch controls 28 on the panel 26, energize the forward or/and reverse power lines 209 and 211 to actuate the motor 50 for moving the carriage 34 to position the densitometer pick-up head 66 over the unprinted area 102 of the work piece 18. The calibration or "zeroing"of the apparatus 10 then involves two types of adjustments, both of which may be effected with controls 28 on the panel 26, but both of which must be carried out for each of the filters 250 for the six colors of the selected set, which requires that the operator be able to conveniently reset the filter assembly 228 to its initial position disposing the yellow-complement filter 250 in operative position and thereafter manually index the assembly 228 from filter to filter 250.

The means provided for accomplishing such manual resetting and indexing of the filter assembly 228 (which is also employed in automatic resetting and indexing of the filter assembly 228 in response to control inputs subsequently identified) includes a gated, astable multivibrator 300 for supplying pulses via lead 301 to one of the inputs of the OR circuit 258, each of which pulses in turn triggers the motor drive circuit 256 to alter the phase of its output for advancing the motor 254 and filter disc 252 through a 60 degree angular rotation to move the next filter 250 into operative position. Manual index and reset switches 302 and 304 on the panel 26 are coupled with the multivibrator 300 for actuating it to output the pulse signal required for the corresponding function.

The first facet of zero calibration for each of the filters 250 involves the fact that, since color density measurements are derived from the time required for the capacitor 236 to discharge as influenced by light intensity dependent conductivity of the photomultiplier tube 230, such time referenced, density data, source parameter must be conformed to industry or other acceptable standards of numerically representing color densities. This is the purpose of the calibration resistance select circuit 238, which includes an adjustable resistance for each color filter 250. By varying the resistance through the circuit 238, the rate at which the capacitor 236 will discharge can be adjusted to numerically conform the density measurements effected to a standard or other desired scale, since altering the discharge rate of the capacitor 236 similarly alters the lag time by which the read pulse from the dynode detector 240 follows the clock start pulse from the anode detector 246, and thereby the numerical expression of the density measurement stored in the registers 410, 412 and 414. The variable resistances of the circuit 238 are adjustable from the panel 26, and the appropriate resistance for each filter 250 is automatically selected as a consequence of indexing of the filter assembly 228 even during manual calibration through gating internal to the circuit 238 controlled by signals supplied via leads 303 and 305 from the output of a 1 of N flipflop, filter anticipation circuit 306. The same OR circuit 258 that triggers the motor drive circuit 256 also provides an output pulse to input lead 307 of the anticipation circuit 306, in response to which the latter alters the condition of its flipflops to generate the signals required by the calibration resistance select circuit 238 for selecting the appropriate internal resistance for the next filter 250 being moved into operative position.

The other facet of the calibration procedure involves establishing the level of density measurement to be treated as zero. This is accomplished by adjusting the level of energization of the light emitting diode 246, which in turn alters the conduction of the photodiode 242 that constitutes the anode load for the photo-multiplier tube 230 to alter the conduction of the latter. For such purpose, a LED driver circuit 308 is provided having an adjustable resistance for each color filter 250, which resistances may be varied from the panel 26. Selection of the appropriate resistance for each particular filter 250 is effected automatically in the same manner as just described for the circuit 238, it being noted that the same control signals from the anticipation circuit 306 are also supplied to the driver circuit 308 via line 305.

After calibration, the operator will preferably return the carriage 34 to its home position by deactivating the stop button 208 in automatic mode, or by deactivating the stop button 208 and activating the return button 214; then at the operator's option, he can press the forward scan start switch 210 to commence an automatic scanning and density checking cycle. Thereupon, the scan control module 204 energizes the forward power line 209, and the motor 50 moves the carriage 34 toward the work piece 18. Concurrently, the scan control module 204 also supplies a filter reset initiate pulse to the astable multivibrator 300 via lead 219. The multivibrator 300 then supplies pulses via lead 301 to the OR circuit 258 for successively indexing the filter assembly 228 in 60 degree increments until the yellow-complement (blue) filter 250 has moved into operative filtering position. As the filter assembly 228 is thus being indexed toward its reset position, the coded filter identification signals for each filter 250 which arrives at operative position will be processed through the modules 262 and 264 and fed as a control input to the anticipation circuit 306 via lead 241. When the filter assembly 228 has been indexed to its first or yellow-complement filter 250, the coded identification signal for the latter will cause the anticipation circuit 306 to output a stop pulse to the astable multivibrator 300, whereupon the pulse output from the latter to the OR circuit 258 will terminate and the indexing of the assembly 228 will stop with the disc 252 in its reset position.

Meanwhile, the carriage 34 continues to move toward the work piece 18. When the carriage 34 has reached a position disposing the pick-up head 66 over the bare stock zone 102 but about ⅛ inch from the end 100 of the control strip 20, the carriage 34 will engage and actuate a start limit switch 310 mounted on the housing structure 12 at a location appropriate for that purpose. Actuation of the switch 310 starts a gated clock 312 with which it is coupled. The pulse output from the clock 312 is fed to a counted 314 adapted to count to six, to an OR circuit 316 via lead 307, and to the OR circuit 258 via lead 309. During the count to six by the counter 314, it delivers a signal to the motor control module 200 via line 213 to temporarily stop the motor 50 and carriage 34 with the head 66 positioned over the bare stock area 102; a signal via lead 311, terminal 566 of the printer 502 and lead 586 to the zero print spacing control input of the multivibrator 580 of the printer 502; and an inhibit signal delivered via lines 313 and 315 to a first block flipflop 318 and a latch 320 for purposes later explained. The six pulses being fed from the clock 312 (as the counter 314 counts to six) to the OR circuits 316 and 258 simultaneously result in six successive zero calibration check cycles, during each of which cycles a print pulse output from OR circuit 316 is delivered via lead 317 to the print command terminal 564 of the printer 502 to cause the printing of the density measured for the bare stock area 102 for each filter 250 in turn (in the manner previously described as to the internal operation of the densitometer measuring structure and the printer, and with reduced spacing of the printed data on the tape 70 because of the concurrent zero print spacing signal being delivered to line 311 from the counter 314) and a filter index pulse output from OR circuit 258 is delivered to the motor drive module 256 to cause indexing of the assembly 228 to the next filter 250. When the counter 314 has counted to six, the required zero calibration verification measurements will have been made and printed, the assembly 228 will have returned after six indexings to its reset position, and the counter 314 will then output a clock stop pulse via line 319 to stop the clock 312 and will concurrently terminate the inhibit signal being delivered to the first block flipflop 318 and the latch 320 via leads 313 and 315, the scan stop signal being delivered via line 213 to the motor control module 200, and the zero print spacing signal being delivered via line 311 to the printer 502 during the zero verification phase of the operational sequence.

Since the scan control module 204 is continuing to supply energization to the forward power lead 209, termination by the counter 314 of the motor stop signal applied to the motor control module 200 during the zero verification phase will result in forward motion of the motor 50 and the carriage 34 being automatically resumed. Meanwhile, the densitometer portion of the apparatus 10 continues to make density measurements on the remaining part of the bare stock area 102 at the rate of approximately 60 per second as the pick-up head 66 approaches the leading end 100 of the control strip 20. As previously noted in describing the densitometer portion of the apparatus 10, every color density measurement is stored in and available from the storage registers 410, 412 and 414 (FIG. 8) in binary coded decimal form. Such coded numerical density data in the registers 410, 412 and 416 is monitored by a pair of digital-to-analog converters 322 and 324 via leads 321, 323 and 325 for converter 322 and via branch leads 327, 329 and 331 and a gated storage register 326 interposed in the latter. The monitoring of density measurement data by the converter 322 is continuous so that new data appearing in the registers 410, 412 and 414 also is fed to the converter 322 immediately. However, for the data being fed to the converter 324 to be "updated", it is necessary that it first be strobed into the gated register 326 by a gating pulse applied to its control input line 333. Such gating pulses for the register 326 are derived from the read pulses produced at the output lead 229 of the dynode reference voltage detector 240 via lead 335, but are delayed by a delay element 328 interposed between the leads 335 and 333 by a period of approximately one-half the average interval between read pulses. Accordingly, there is a period between successive strobe pulses to the register 326 during which data for a new density measurement is being applied to the converter 322, while the register 326 still holds and is applying to the converter 324 data resulting from the last previously density measurement. This relationship is employed for the detection of changes of predetermined extent between successive density measurements in the manner next described.

If successive density measurements remain the same, the digital inputs to the converters 322 and 324 and their respective analog outputs to leads 337 and 339 will also both remain the same. If the later of successive density measurements is changed from the preceding one, however, the digital inputs to the converters 322 and 324 and their respective analog outputs to leads 337 and 339 will both be different during the above-mentioned strobe delay period. The converter outputs on leads 337 and 339 are fed to an analog comparator 330 adapted to deliver a substantial density change output pulse to lead 341 when the difference between successive density measurements exceeds an adjustable threshold amount determined by the setting of a variable threshold control component 332 associated with the comparator 330. Production of such a density change pulse normally results from the densitometer pick-up head 66 passing over a seam or interface of a trap block between adjacent color patches (or a patch and blank) in the control strip 20.

Thus, as the scanning movement of the carriage 34 is continued to move the pick-up head 66 from the bare stock area 102 across the leading edge 100 of athe control strip 20 and into the yellow block 106, the pair of successive color density measurements made at 1/60 of a second intervals on the opposite sides of such seam or interface 100 will be sufficiently different to produce a density change pulse at the output lead 341 of the analog comparator 330. Such density change pulse is applied concurrently to a missing pulse generating module 332 (which is functionally insignificant when the work piece 18 is imprinted with all of the selected set of colors, as now being assumed, but whose vital function when the work piece 18 has been imprinted with only some lesser number of colors, so that the control stip 20 contains imprinted blank blocks, will be subsequently explained) and to the latch 320. Remembering that the latch 320 is no longer inhibited (as it was during zero calibration verification to prevent any signal from the comparator 330 from then having any effect), the density change pulse from the comparator 330 will pass through the latch 320 to a blanking one-shot multivibrator 334, which it triggers to produce at the output of the multivibrator 334 a seam recognition pulse that is of duration lasting until just prior to the time when the pick-up head 66 would be expected to pass over the seam at the leading edge of the next trap block (yellow-magenta, 108) with normal scanning movement of the carriage 34. Such seam recognition pulse from the multivibrator 334 is applied back to latch 320 via lead 343 to inhibit the latch 320 from passing any more density change pulses from the comparator 330 during the period of the existing seam recognition pulse.

The seam recognition pulse from the multivibrator 334 is also applied via lead 345 to one input of an AND gate 336, which obtains its other input from the first block flipflop 318 via lead 347. This would normally, with any subsequently scanned color block of the control strip 20, result in a control pulse being fed from the AND gate via lead 349 to the OR gate 238 to cause indexing of the assembly 228 to the next filter 250. However, since the first block flipflop 318 was set at the conclusion of the calibration verification phase, no such filter indexing will be initiated in response to sensing of the seam 100 between the bare stock area 102 and the first color block 106. Of course, no such indexing is required for the first yellow block of the control strip 20, since the assembly 228 has been left with the yellow-complement filter 250 in operative position at the conclusion of the calibration phase.

Thirdly, the seam recognition pulse output from the multivibrator 334 is also applied to a print one-shot multivibrator 338, which, after a predetermined time to permit the continuing scanning movement of the carriage 34 to advance the pick-up head 66 to a predetermined position well within the unmixed yellow block 106 with a normal rate of scanning, outputs a print pulse that passes through an OR gate 340 and the OR gate 316 onto the print pulse lead 317 to the printer unit 502 to cause printing of what has thus been selected as the definitive density measurement for the yellow block 106 (as well as to print the abbreviation for yellow and advance the paper tape 70 with a normal spacing for juxtaposing the data to be next printed for next block 112 in transverse alignment with the latter as the tape 70 is emitted and layed alongside the control strip 20 by the printer 502).

The pulse output from the print multivibrator 338 is also applied to a paper advance one-shot multivibrator 334, which outputs a paper advance pulse to the printer unit 502 via lead 351, terminal 564 and lead 586 to cause advancement of the paper tape 70 without printing, as required to maintain proper juxtaposition between the data on the tape 70 and the color blocks of the control strip 20 since no data printing will be cone for the trap block (yellow-magenta, 108) next to be encountered by the pick-up head 66.

The pulse ouput from the multivibrator 344 is also applied to the first block flipflop 318 to reset the latter, in order that filter indexing will not subsequently be inhibited.

The seam recognition pulse output by the blanking multivibrator 334 terminates shortly before the pick-up head 66 reaches the trap 108, so that the latch 320 is re-enabled to pass the next density change pulse from the analog comparator 330 (or missing pulse signal from the generating module 332). Thus, as the pick-up head 66 crosses the seam between the yellow block 106 and the yellow-magenta trap block 108, the analog comparator 330 will produce a density change pulse that will be passed by the latch 320 and will result in same functions of the one-shot multivibrators 334, 338, and 344 for the magenta block 112, and the magenta-cyan trap block 114 as just noted for the corresponding yellow component blocks, except that, with the first block flipflop 318 reset, the AND circuit 336 will pass the filter indexing signal from the multivibrator 334 to the filter control OR circuit 238 as soon as the yellow-magenta trap block 108 is recognized to index the assembly 228 for moving the magenta-complement (green) filter 250 into operative position before the pick-up head 66 reaches the magenta block 112.

The described process is then iterated for each successive color along the control strip 20 until the later has been completely scanned. When the carriage 34 reaches its finish position and activates the limit switch there provided, the scan control module 294 energizes the solenoid 268 to cut off the printed strip of paper tape 70 juxtaposed alongside the control strip 20, deenergizes the forward power line 209 and energizes the reverse power line 211, so that the motor 50 will return the carriage 34 to its home position, whereupon another limit switch will be actuated to stop the motor 50.

When checking a work piece 18 which is not imprinted with all of the colors of the selected set and whose control strip 20 therefore includes blank blocks of bare stock in the positions that would otherwise have occupied by the imprinted colors, the operation is substantially the same as above described, except for the important functional contribution made by the missing pulse generator module 332. Since the trap blocks of the control strip 20, which are usually relied upon to provide the seams that cause the comparator 330 to provide the significant seam recognition pulses employed to automatically control filter indexing, printing and tape advancement, are equally spaced along the control strip 20, and since the time interval between scanning successive seams with a normal rate of movement of the carriage 34 is therefore known, the missing pulse generator 332 is arranged to monitor whether or not a seam recognition pulse is input to it from the comparator 330 within the expected interval as established from the reference provided by the pulses received via line 245 from the one-shot multivibrator 274 triggered by the travel sensing assembly 82. As previously noted, as long as timely seam recogition pulses are received by the missing pulse generator 332, its remedial function remains dormant. However, if a timely seam recognition pulse is not received by the generator 332 whenever one is expected, as when certain blocks of the control strip 20 are blank, then the generator 332 outputs to the latch 320 an artificial seam recognition substitute pulse, which is passed by the latch 320 to perform the vital function of indexing the assembly 228 at the regular intervals required to assure that the proper filter 250 for the next color block encountered will be in the operative filtering position when needed. Since the generator 332 can perform its remedial function as many times as needed, any number of the colors of the selected set may be omitted or remain unimprinted at the time the work piece 18 is checked.

One further important aspect of the apparatus 10 should be mentioned. Not only the missing pulse generator 332, but also the automatic function controlling one-shot multivibrators 334, 338, and 344, rely essentially upon a time reference for performing their functions properly. This creates no problem if the motor 50 runs uniformly at a predetermined normal speed. However, fluctuations in scanning rate due to supply line voltage changes and miscellaneous other factors such as imperfections in mechanisms of reasonable cost for driving the carriage 34 are realities that must be provided for in commercially practical apparatus. This is the important function of the travel sensing assembly 82 and its associated one-shot multivibrator 274, the output of which it will be noted is coupled via line 245 as a control input to the generator 332 and each of the multivibrators 334, 338, and 344. More specifically, the desired automatic adjustment of the timing parameters of the lastmentioned modules is accomplished by employing the duty cycle of the square wave pulses output from the multivibrator 274, which is proportional to the actual scanning speed, to appropriately vary the charging rate of timing capacitances provided internally of each of the modules 332, 334, 338, and 344.

From the foregoing, it is believed clear that our invention is well suited to the accomplishment of its objects. It should be equally apparent, however, that a variety of minor modifications and substitutions could be made in both the method and apparatus aspects of the invention without materially departing from the gist and essence thereof. Accordingly, it is intended that the invention should be deemed limited only by the fair scope of the subject matter of the claims which follow and all reasonable equivalents thereof.

We claim:

1. In a method for obtaining color density data for a work piece printed in a selected number of a predetermined set of colors from an elongate control strip imprinted on said work piece and containing aligned blocks imprinted in each of said number of colors and arranged in cyclic order according to colors along the linear length of said strip:
    making repeated measurements of color density at successive locations along said control strip at intervals such that a plurality of such measurements will be made in respect of each block of said strip while continuously scanning the length of said strip;
    detecting a change in the magnitude of a pair of successive density measurements of sufficient extent to indicate a transition during scanning of the locations of said pair of successive measurements between an area of said strip included in one of said blocks thereof and an adjacent area of said strip of color characteristics different from said one block thereof; and
    responsive to detection of a density magnitude change as aforesaid, thereafter selecting as a significant density measurement for an imprinted block a density measurement made when said scanning has proceeded a predetermined distance from the location at which said magnitude change was detected.

2. The invention of claim 1, wherein is included the additional step of:
    responsive to detection of a density change as aforesaid thereafter recording said significant density measurement.

3. The invention of claim 1, wherein the making of each of said density measurements includes:
    picking up light reflected from the location along said control strip then being scanned,
    selectively filtering said light, and
    sensing the intensity of said light after said filtering thereof;
    and there is included the additional step of responsive to detection of a density magnitude change as aforesaid, altering the character of said selective filtering applied to said light prior to said selection of said significant density measurement.

4. The invention of claim 3, wherein:
    said detection step detects said change in the magnitude of successive density measurements for a transition during scanning of the locations of successive measurements between a blank block of said strip and a colored block of said strip, as well as between adjacent colored blocks of said strip; and
    said filtering altering step is performed in response to each detection of either of said types of transition.

5. In a method for controlling automatic scanning of an elongate clor control strip containing a series of aligned blocks imprinted in a number of different colors with said blocks being arranged in cyclic order according to colors along the length of said strip:
    initiating a normally continuing scan along a linear path normally juxtaposed in alignment with said strip along the length of the latter;
    sensing color-dependent optical properties of a succession of first blocks as said scan proceeds and producing a first electrical signal corresponding thereto;
    simultaneously sensing color-dependent properties of a succession of second blocks of colors corresponding to said first blocks but from a different cyclic set of blocks than said first blocks as said scan process and producing a second electrical signal corresponding thereto;
    comparing said first and second electrical signals and producing an electrical control signal when they are substantially different;
    terminating said scan in response to the production of said control signal.

6. The invention of claim 5, wherein said properties of said first blocks are detected adjacent one lateral edge of said strip and said properties of said second blocks are detected the opposite lateral edge thereof.

7. In color density checking apparatus for use in controlling the quality of reproduction of colored subject matter in types of multi-colored printing in which separate impressions for each of a selected number of a predetermined set of different colors are successively imprinted in registry with each other upon the same stock and in which each of said impressions includes both the components of said subject matter involving that one of said number of colors corresponding to that particular impression and a plurality of blocks of said one color corresponding to that particular impression so disposed in relation to said blocks of the impressions for other of said number of colors as to present upon the stock, after imprinting upon the latter of at least one of said impressions, a linearly aligned series of colored blocks for those of said number of colors for which the corresponding impressions have been imprinted, with possible interspersed blank blocks for any of said plurality of colors for which the corresponding impressions have not been imprinted and any of said set of colors not included in said number thereof, and with said blocks and possible blanks arranged in a predetermined cyclic order according to colors along the linear length of said series thereof;
    a reflection type color densitometer assembly including pick-up means for receiving light reflected from an area of said stock no larger than one of said blocks imprinted thereon when appropriately juxtaposed with said one block, photo-electric means for providing an electrical output signal of characteristics having a correspondence relationship with the intensity of light applied thereto, means for providing a path for the passage of light from said pick-up means to said photo-electric means, a plurality of optical filters adapted for filtering light of different ones of said set of colors, shiftable indexing means for supporting said filters for successive interposition in said path in the same order as said predetermined cyclic order of said blocks in said series for the colors which said filters are adapted to filter, and electrically responsive actuating means operably couple with said indexing means for actuating the latter to advance the next filter in said order into interposition in said path;

means for supporting said printed stock;

means for supporting said pick-up means in operative juxtaposition with said printed stock for receiving light reflected from an area as aforesaid of the latter;

drive means operably intercoupling said pick-up supporting means and said stock supporting means for producing relative movement therebetween along a course of relative displacement thereof bringing said pick-up means into sequential operative juxtaposition with successive blocks of said series thereof on said stock as said relative motion along said course proceeds;

sensing means electrically coupled with said photo-electric means for sensing a change in the characteristics of said output signal from the latter as the operating juxtaposition of said pick-up means passes over a boundary between adjacent blocks of differing color characteristics and for providing an electrical output signal representing said sensing; and electrically responsive first control means electrically coupled with said sensing means and said actuating means for causing the latter to actuate said indexing means to advance the next filter in said order into interposition in said path in response to a sensing by said sensing means of said change in the characteristics of said output signal from said photo-electric means, whereby said filters are automatically and successively indexed in response to said sensings to move the proper filter into its operative disposition for checking the density of the next color block as said relative movement between said pick-up supporting means and said stock supporting means proceeds.

8. The invention of claim 7, wherein is provided:

means for measuring said relative movement between said pick-up supporting means and said stock supporting means and for providing an electrical output representing said measurement; and electrically responsive second control means electrically coupled with said sensing means, said measuring means and said first control means for activating the latter to cause said actuating means to actuate said shiftable means to advance the next filter in said order into interposition in said path in response to the absence of a sensing by said sensing means of a change in the characteristics of said output signal from said photo-electric means during a predetermined relative movement between said pick-up supporting means and said stock supporting means measured by said measuring means, whereby said filters are automatically and successively indexed in response to the occurrence of possible interspersed blank blocks in said series of blocks to assure that the proper filter will be in its operative disposition when the next color block is encountered by said pick-up means.

9. The invention of claim 7, wherein is provided:

means for detecting the position of said indexing means and for providing an electrical output signal corresponding to the indentity of the one of said filters which is interposed in said path; and auxiliary control means automatically operable upon initiation of operation of said drive means and electrically coupled with said detecting means and said actuating means for automaticlly causing the latter to actuate said indexing means iteratively to advance successive ones of said filters into interposition in said path until a particular preselected one of said filters is interposed in said path.

10. The invention of claim 7, wherein said filters are equal in number to the colors of said set.

11. The invention of claim 10, wherein said filters are substantially complementary in color to the colors of said set.

12. The invention of claim 7, wherein said photoelectric means includes:

a photo-multiplier tube having a dynode and an anode, a half-wave, alternating current power source coupled with said dynode, a capacitor coupled with said dynode, means for detecting displacement of the voltage at said dynode from a predetermined reference level, and means for detecting displacement of the current flow at said anode from a predetermined reference level.

13. The invention of claim 12, wherein is provided:

electrically activatable clock means adapted to generate a train of pulses at a predetermined repetition rate, means coupling said anode detector means with said clock means for activating said clock means in response to detection of said displacement of current flow, and means for counting said pulses generated by said clock means.

14. The invention of claim 13, wherein is provided:

electrically gateable memory means coupled with said counting means for storing the count from the latter when said memory means are gated, and means coupling said dynode detector means with said memory means for gating the latter in response to detection of said displacement of voltage.

15. The invention of claim 7, wherein:

said pick-up supporting means includes a carriage reciprocally mounted on said stock supporting means.

16. The invention of claim 15, wherein:

said drive means includes a reversible electric motor.

17. The invention of claim 7, wherein:

said filters are mounted in an annular row on a rotatable disc, and said indexing means includes a servo motor sensitive to the phase of electrical power applied thereto, and pulse responsive means for shifting the phase of power applied to said servo motor in predetermined increments.

18. The invention of claim 7, wherein said sensing means includes:

first means for storing a representation of said output signal of said photo-electric means existing at one time, second means for storing a representation of said output signal of said photo-electric means existing a predetermined interval after said one time, and means for comparing said representations stored in said first and second storing means.

19. The invention of claim 18, wherein:

said comparing means includes means for outputting an electrical pulse to said first control means when said representation are different.

20. The invention of claim 19, wherein is provided:

means separate from said comparing means and coupled with the latter for detecting pulses output therefrom and for outputting an electrical pulse to said frist control means when no pulse is output by said comparing means during a controlled interval.

21. The invention of claim 20, wherein is provided:

means coupled with said separate means and responsive to the speed of relative movement between said pick-up supporting means and said stock supporting means for varying said controlled interval.

22. The invention of claim 7, wherein is provided:

means for sensing the intensity of light reflected from an area within and adjacent one transverse edge of one of said blocks within one color set cycle of said series of blocks and for producing a first electrical signal corresponding thereto;

means for sensing the intensity of light reflected from an area within and adjacent the opposite transverse edge of the correspondingly colored block within another color set cycle of said series of blocks and for producing a second electrical signal corresponding thereto; and means coupled with said two last-mentioned sensing means and with said drive means for interrupting said relative movement between said pick-up supporting means and said stock supporting means when said first and second signals are substantially different.

23. The invention of claim 7, wherein is provided:

printing means, including tape transporting means and means adapted for imprinting on a tape representations of color density measurements made by said densitometer assembly;

color density data encoding means coupled between said phot-electric means of said densitometer assembly and said printing means for enabling the printing means to imprint a representation corresponding to any particular color density measurement made by the photo-electric means; and further control means electrically coupled with said sensing means and said printing means for actuating the latter to imprint on said tape a representation corresponding to a significant color density measurement made by the photo-electric means at a predetermined interval after a sensing by said sensing means of said change in the characteristics of said output signal from said photo-electric means.

24. The invention of claim 23, wherein is provided:

means coupled with said further control means and said transporting means for actuating the latter to advance said tape after the imprinting thereon of each representation of a significant color density measurement.

25. The invention of claim 24, wherein said tape is advance in increments which maintain the spacing along the tape of said representation of significant color density measurements equal to the spacing in said control strip of the color blocks to which said measurements correspond, whereby said representations on the tape will be juxtaposed with said blocks of the control strip when the tape is placed alongside the control strip.

26. The invention of claim 25, wherein said transporting means includes means for laying down said tape alongside said control strip with said representations juxtaposed with the corresponding blocks during said relative movement between said pick-up supporting means and said stock supporting means.

* * * * *